(12) United States Patent
Kojima et al.

(10) Patent No.: US 9,200,694 B2
(45) Date of Patent: Dec. 1, 2015

(54) VIBRATION DAMPING DEVICE

(75) Inventors: Hiroshi Kojima, Yokohama (JP);
Masahiro Sawaguchi, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 197 days.

(21) Appl. No.: 13/824,158

(22) PCT Filed: Sep. 26, 2011

(86) PCT No.: PCT/JP2011/071902
§ 371 (c)(1),
(2), (4) Date: Mar. 15, 2013

(87) PCT Pub. No.: WO2012/043483
PCT Pub. Date: Apr. 5, 2012

(65) Prior Publication Data
US 2013/0175745 A1 Jul. 11, 2013

(30) Foreign Application Priority Data

Sep. 27, 2010 (JP) .................. 2010-215763
Sep. 27, 2010 (JP) .................. 2010-215764
Oct. 20, 2010 (JP) .................. 2010-235527

(51) Int. Cl.
| F16F 13/00 | (2006.01) |
| F16F 13/08 | (2006.01) |
| F16F 13/10 | (2006.01) |
| F16F 13/18 | (2006.01) |

(52) U.S. Cl.
CPC ............. *F16F 13/08* (2013.01); *F16F 13/108* (2013.01); *F16F 13/18* (2013.01)

(58) Field of Classification Search
CPC .......... F16F 13/08; F16F 13/108; F16F 13/18
USPC ........... 267/140.13, 140.11, 140.12; 248/562, 248/566
See application file for complete search history.

(56) References Cited

U.S. PATENT DOCUMENTS

| 4,840,359 | A  * | 6/1989  | Hamaekers et al. ..... 267/140.12 |
| 6,443,438 | B2 * | 9/2002  | Satori et al. .............. 267/140.13 |
| 6,663,090 | B2 * | 12/2003 | Simuttis et al. .......... 267/140.13 |
| 7,044,455 | B2 * | 5/2006  | Yoshida et al. .......... 267/140.13 |
| 7,293,755 | B2 * | 11/2007 | Miyahara et al. ............. 248/562 |
| 7,314,213 | B2 * | 1/2008  | Tanaka ....................... 267/140.5 |

(Continued)

FOREIGN PATENT DOCUMENTS

| JP | 2002-310219 A | 10/2002 |
| JP | 2002-327788 A | 11/2002 |

(Continued)

OTHER PUBLICATIONS

International Search Report for PCT/JP2011/071902 dated Dec. 27, 2011.

*Primary Examiner* — Thomas J Williams
*Assistant Examiner* — Mariano Sy
(74) *Attorney, Agent, or Firm* — Sughrue Mion, PLLC

(57) ABSTRACT

A partitioning wall is integrally formed to a rubber elastic body, partitioning second main liquid chambers. An upper outer peripheral member and a lower outer peripheral member are positioned in the axial direction by a partitioning wall positioning member disposed in the second main liquid chambers. The partitioning wall is retained to the peripheral inside of a retaining member in an axial direction (S) compressed state.

13 Claims, 30 Drawing Sheets

(56) References Cited

U.S. PATENT DOCUMENTS

| | | | | |
|---|---|---|---|---|
| 8,231,116 B2 * | 7/2012 | Nishi | ................ | 267/140.13 |
| 8,302,946 B2 * | 11/2012 | Kojima et al. | ............ | 267/140.13 |
| 8,308,147 B2 * | 11/2012 | Kojima et al. | ............ | 267/140.12 |
| 8,454,002 B2 * | 6/2013 | Nishi et al. | ................ | 267/140.13 |

FOREIGN PATENT DOCUMENTS

| | | |
|---|---|---|
| JP | 2002-327789 A | 11/2002 |
| JP | 2007-278399 A | 10/2007 |
| JP | 2008-111543 A | 5/2008 |

* cited by examiner

VIBRATION DAMPING DEVICE

CROSS REFERENCE TO RELATED APPLICATIONS

This application is a National Stage of International Application No. PCT/JP2011/071902 filed Sep. 26, 2011, claiming priority based on Japanese Patent Application Nos. 2010-215763 and 2010-215764 filed Sep. 27, 2010, respectively, and Japanese Patent Application No. 2010-235527 filed Oct. 20, 2010, the contents of all of which are incorporated herein by reference in their entirety.

TECHNICAL FIELD

The present invention relates to a liquid-filled vibration damping device that prevents the transmission of vibrations from a vibration generating member, and in particular relates to a vibration damping device that is preferably employed in for example a vehicle engine mount.

BACKGROUND ART

For example, a vibration damping device is installed in vehicles such as passenger vehicles as an engine mount between an engine that is a vibration generation section and a vehicle body that is a vibration receiving section. In such a vibration damping device, when axial direction relative movement between an inner cylinder and an outer cylinder occurs due to vibration generated by the engine, an elastic body that connects the inner cylinder and the outer cylinder undergoes elastic deformation, and the vibration is attenuated due to liquid moving between a first main liquid chamber and an auxiliary liquid chamber. In a vibration damping device disclosed in Japanese Patent Application Laid-Open (JP-A) No. 2002-310219, in addition to the above structure, two main liquid chambers (second main liquid chambers) are disposed in a direction orthogonal to the axial direction (an axis orthogonal direction), and the second main liquid chambers are placed in communication with the auxiliary liquid chamber. Axis orthogonal direction vibration is attenuated by the movement of liquid between the plural liquid chambers.

However, a dividing wall is formed to partition between the plural second main liquid chambers in vibration damping device structures capable of such axis orthogonal direction vibration attenuation. Stress readily concentrates in the dividing wall due to the action of compression and pulling forces in the axial direction, and enhanced durability is demanded.

In a vibration damping device disclosed in JP-A No. 2007-278399, an elastic body and dividing wall are configured as two separate members. The durability of the dividing wall is enhanced due to this two-member assembly. However, in a two-member assembly, each member needs to be manufactured separately, increasing manufacturing costs.

DISCLOSURE OF INVENTION

Technical Problem

In consideration of the above circumstances, an object of the present invention is to enhance the durability of a partitioning wall in a vibration damping device that attenuates vibration in an axis orthogonal direction orthogonal to the axial direction, as well as in the axial direction.

Solution to Problem

A vibration damping device according to a first aspect of the present invention includes: an inside attachment member that is coupled to one section out of a vibration generation section or a vibration receiving section; an outer peripheral member that is coupled to the other section out of the vibration generation section or the vibration receiving section, that is disposed so as to surround the outer periphery of the inside attachment member as viewed along a main vibration input direction, and that includes an upper segment and a lower segment that are segmented in the main vibration input direction; an elastic body that is disposed between the inside attachment member and the outer peripheral member, and that elastically connects together the inside attachment member and the outer peripheral member; a first main liquid chamber that is configured at the inside of the outer peripheral member and at the lower segment side and main vibration input direction outside of the inside attachment member, that includes an internal wall having at least a portion configured by the elastic body, and that is filled with liquid; an auxiliary liquid chamber that is filled with liquid and includes a dividing wall having a portion formed by a diaphragm such that the auxiliary liquid chamber internal volume is capable of expanding and contracting in response to liquid pressure changes; a first restriction path that places the first main liquid chamber and the auxiliary liquid chamber in communication with each other and that enables liquid through flow; a liquid chamber that is disposed between the inside attachment member and the outer peripheral member as viewed along the main vibration input direction, that has the elastic body partitioning between the liquid chamber and the first main liquid chamber, and that is filled with liquid; a partitioning wall that is integrally formed to the elastic body, and that partitions the liquid chamber into plural second main liquid chambers disposed around the outer circumferential direction of the inside attachment member; a positioning member that is disposed between the upper segment and the lower segment of the outer peripheral member and coupled to both segments, and that performs positioning between the upper segment and the lower segment in the main vibration input direction such that the partitioning wall is in a compressed state in the main vibration input direction; a retaining member configured in a cylinder shape that retains the upper segment and the lower segment positioned by the positioning member inside the cylinder; and a second restriction path that enables liquid to flow between the plural second main liquid chambers, or between each of the second main liquid chambers and the auxiliary liquid chamber.

In the vibration damping device of the first aspect, when vibration is input from the vibration generation section side to either the inside attachment member or the outer peripheral member, the elastic body that is disposed between the inside attachment member and the outer peripheral member undergoes elastic deformation due to the input vibration. Vibration is absorbed by vibration absorbing action based on for example internal friction of the elastic body, reducing the vibration that is transmitted to the vibration receiving section side. Note that a portion of the vibration is absorbed by the vibration absorbing action of the elastic body regardless of whether the input vibration is a main vibration direction vibration or a vibration in a direction substantially orthogonal to the main vibration.

Moreover, when vibration is input in the main vibration direction, the first main liquid chamber expands and contracts due to the elastic deformation of the elastic body, and liquid flows through the first restriction path between the first main liquid chamber and the auxiliary liquid chamber. A damping function is exhibited due to for example liquid column resonance inside the first restriction path.

However, when vibration is input in a direction substantially orthogonal to the main vibration direction, the second main liquid chambers configured between the inside attachment member and the outer peripheral member expand and contract due to relative movement of the inside attachment member and the outer peripheral member. Liquid flows between these liquid chambers when the second main liquid chambers and the auxiliary liquid chamber are in communication with each other. Moreover, when the plural second main liquid chambers partitioned by the partitioning wall are in communication with each other, liquid flows through between these liquid chambers. A damping function is exhibited due to for example liquid column resonance due to this liquid through flow.

In the present aspect, the partitioning wall is integrally formed to the elastic body. The outer peripheral member is segmented into the upper segment and the lower segment in the main vibration input direction. The positioning member is disposed between the upper segment and the lower segment, and main vibration input direction positioning between the upper segment and the lower segment is performed by the positioning member such that the partitioning wall is in a compressed state in the main vibration input direction. The retaining member retains the thus positioned upper segment and the lower segment inside the cylinder.

According to the above configuration, since the outer peripheral member is segmented in the main vibration input direction, the partitioning wall can be made to undergo compression deformation by closing up the distance between the upper segment and the lower segment when the partitioning wall with the retaining member are being retained. Precompression is applied to the partitioning wall, accordingly suppressing distortion of the partitioning wall during vibration input, and enabling the durability of the partitioning wall to be enhanced. Moreover, main vibration input direction positioning of the segmented upper segment and lower segment can be performed easily since the positioning member is disposed between the upper segment and the lower segment.

In a vibration damping device according to a second aspect of the present invention, the positioning member is divided into plural divisions around the circumferential direction of the retaining member.

Assembly can be performed with ease by thus dividing the positioning member into plural divisions around the circumferential direction.

In a vibration damping device according to a third aspect of the present invention, both main vibration input direction end faces of the positioning member respectively contact the upper segment and the lower segment, preventing the upper segment and the lower segment from moving in a direction approaching each other.

Positioning can be performed with a simple configuration by thus making the positioning member contact end faces of the upper segment and the lower segment.

In a vibration damping device according to a fourth aspect of the present invention, at least one of the upper segment or the lower segment is disposed to the peripheral inside of the positioning member.

Simple assembly of at least one of the upper segment or the lower segment to the positioning member can be achieved by thus disposing the upper segment or the lower segment, or both the upper segment and the lower segment, to the peripheral inside of the positioning member.

In a vibration damping device according to a fifth aspect of the present invention, the second restriction path is configured between the positioning member and the retaining member.

The positioning member can be employed to simply configure the first main liquid chamber between the positioning member and the retaining member when an outer peripheral wall of the second main liquid chamber is configured by the positioning member.

In a vibration damping device according to a sixth aspect of the present invention, at least one of the upper segment or the lower segment includes an extension portion that extends towards the other of the upper segment or the lower segment, and the positioning member performs positioning between the upper segment and the lower segment by the extension portion contacting the other of the upper segment or the lower segment.

Positioning between the upper segment and the lower segment can be performed without employing a separate member by thus forming the extension portion to the upper segment or the lower segment, or to both the upper segment and the lower segment.

In a vibration damping device according to a seventh aspect of the present invention, the second restriction path is configured between the retaining member and the lower segment.

The second restriction path can accordingly be configured between the retaining member and the lower segment.

In a vibration damping device according to an eighth aspect of the present invention, a slit is formed at the partitioning wall at a position between the upper segment and the lower segment and from the outer peripheral member side outer face of the partitioning wall towards the inside attachment member as viewed along the main vibration direction, and positioning between the upper outer peripheral member and the lower outer peripheral member is performed by the positioning member such that the interfaces of the slit in the partitioning wall are pressed against each other.

Forming the slit in the partitioning wall divides the partitioning wall into an upper segment side and a lower segment side on either side of the slit. The divided upper and lower portions are accordingly capable of vibrating separately during vibration input, thereby enabling distortion during vibration input to be suppressed, and enabling an increase in the durability of the partitioning wall.

In a vibration damping device according to a ninth aspect of the present invention, the vibration damping device further includes a partitioning member that is disposed between the first main liquid chamber and the auxiliary liquid chamber and that partitions the chambers from each other, and the first restricting path is configured in the partitioning member.

The first restriction path can be configured in the partitioning member by partitioning the first main liquid chamber and the auxiliary liquid chamber with the partitioning member. Relatively high degrees of freedom can accordingly be achieved for designing for example the path length and cross-section of the first restriction path.

A vibration damping device according to a tenth aspect of the present invention includes: an inside attachment member that is coupled to one section out of a vibration generation section or a vibration receiving section; an outer peripheral member that is coupled to the other section out of the vibration generation section or the vibration receiving section and that is disposed so as to surround the outer periphery of the inside attachment member as viewed along a main vibration input direction; an elastic body that is disposed between the inside attachment member and the outer peripheral member, that elastically connects together the inside attachment member and the outer peripheral member and configures a liquid chamber between the inside attachment member and the outer peripheral member, and that includes an upper elastic body positioned at a main vibration input direction first side and an elastic body main portion positioned at the main vibration input direction other side with the liquid chamber interposed between the upper elastic body and the elastic body main portion; a partitioning wall that is disposed so as to connect together the upper elastic body and the elastic body main portion in a main vibration input direction compressed state, and that partitions the liquid chamber into plural second main liquid chambers disposed around the outer circumferential direction of the inside attachment member; a first main liquid chamber that is configured at the inside of the outer peripheral member and the main vibration input direction outside of the inside attachment member, that includes an internal wall having at least a portion configured by the elastic body main portion, and that is filled with liquid; an auxiliary liquid chamber that is filled with liquid and includes a dividing wall having a portion formed by a diaphragm such that the auxiliary liquid chamber internal volume is capable of expanding and contracting in response to liquid pressure changes; a first restriction path that places the first main liquid chamber and the auxiliary liquid chamber in communication with each other and that enables liquid through flow; and a second restriction path that enables liquid to flow between the plural second main liquid chambers, or between each of the second main liquid chambers and the auxiliary liquid chamber.

In the vibration damping device according to the tenth aspect, when vibration is input from the vibration generation section side to either the inside attachment member or the outer peripheral member, the elastic body that is disposed between the inside attachment member and the outer peripheral member undergoes elastic deformation due to the input vibration. Vibration is absorbed by vibration absorbing action based on for example internal friction in the elastic body, reducing the vibration that is transmitted to the vibration receiving section side. Note that a portion of the vibration is absorbed by the vibration absorbing action of the elastic body regardless of whether the input vibration is a main vibration direction vibration or a vibration in a direction substantially orthogonal to the main vibration.

Moreover, when vibration is input in the main vibration direction, the first main liquid chamber expands and contracts due to elastic deformation of the elastic body, and liquid flows through between the first main liquid chamber and the auxiliary liquid chamber through the first restriction path. A damping function is exhibited due to for example liquid column resonance inside the first restriction path.

However, when vibration is input in a direction substantially orthogonal to the main vibration direction, the second main liquid chambers configured between the inside attachment member and the outer peripheral member expand and contract due to relative movement of the inside attachment member and the outer peripheral member. When the second main liquid chambers and the auxiliary liquid chamber are in communication with each other, liquid flows between these liquid chambers. Moreover, when the plural second main liquid chambers partitioned by the partitioning wall are in communication with each other, liquid flows between these liquid chambers. A damping function is exhibited due to for example liquid column resonance due to such liquid through flow.

In the vibration damping device according to the tenth aspect, the partitioning wall is disposed so as to connect together the upper elastic body and the elastic body main portion in a main vibration input direction compressed state. Distortion of the partitioning wall during vibration input can be suppressed, enabling the durability of the partitioning wall to be enhanced, due to thus disposing the partitioning wall in a main vibration input direction compressed state, namely, by applying precompression.

In a vibration damping device according to an eleventh aspect of the present invention, the upper elastic body is connected to the outer peripheral member by an upper connector fixed to the outer periphery of the upper elastic body and the elastic body main portion is connected to the outer peripheral member by a lower connector fixed to the outer periphery of the elastic body main portion.

Due to thus fixing the connectors (upper connector, lower connector) to the outer periphery of the upper elastic body and the elastic body main portion and connecting the outer peripheral member through the connectors, assembly and positioning can be performed with ease.

In a vibration damping device according to a twelfth aspect of the present invention, the main vibration input direction compression ratio at the radial direction outside of the partitioning wall is greater than the main vibration input direction compression ratio at the radial direction inside of the partitioning wall.

The radial direction inside of the partitioning wall is at a position corresponding to a central portion of the elastic body main portion on the side closest to the inside attachment member. Accordingly, the influence to the spring constant of the elastic body main portion tends to increase as the compression ratio at the radial direction central side of the partitioning wall gets greater. As explained above, the main vibration input direction compression ratio at the radial direction outside of the partitioning wall is set greater than the main vibration input direction compression ratio at the radial direction inside of the partitioning wall, thereby enabling precompression to be applied while still suppressing influence to the elastic body main portion.

In a vibration damping device according to a thirteenth aspect of the present invention a projection portion is formed at an outside face of the upper elastic body corresponding to the partitioning wall.

The strength of the partitioning wall can be increased, and movement during vibration input can be suppressed due to thus forming the projection portion to the outside face of the upper elastic body corresponding to the partitioning wall.

In a vibration damping device according to a fourteenth aspect of the present invention, the inside attachment member is divided in the main vibration input direction, with the upper elastic body connected to a first segment of the inside attachment member and with the elastic body main portion, which is configured as a separate body from the upper elastic body connected to a second segment of the inside attachment member.

Due to thus dividing the inside attachment member, and also configuring the upper elastic body and elastic body main portion as separate bodies respectively connected to the divided inside attachment member, the partitioning wall may also be configured as a separate body to either the upper elastic body or the lower elastic body, or as a separate body to both the upper elastic body and the elastic main portion body. This enables distortion during vibration input to be effectively suppressed.

In a vibration damping device according to a fifteenth aspect of the present invention, the partitioning wall is configured with a slit from the radial direction outside towards the radial direction inside.

By forming the slit in the partitioning wall, the partitioning wall is accordingly divided into an upper elastic body side and a elastic body main portion side on either side of the slit. The divided upper and lower portions are capable of vibrating separately during vibration input, thereby enabling distortion to be suppressed during vibration input, and enabling the durability of the partitioning wall to be enhanced.

Advantageous Effects of Invention

Configuring the present invention as described above enables the durability of a partitioning wall to be enhanced in a vibration damping device that attenuates vibration in an axis orthogonal direction that is orthogonal to an axial direction, as well as in the axial direction.

BEST MODE FOR CARRYING OUT THE INVENTION

First Exemplary Embodiment

Figure 1:
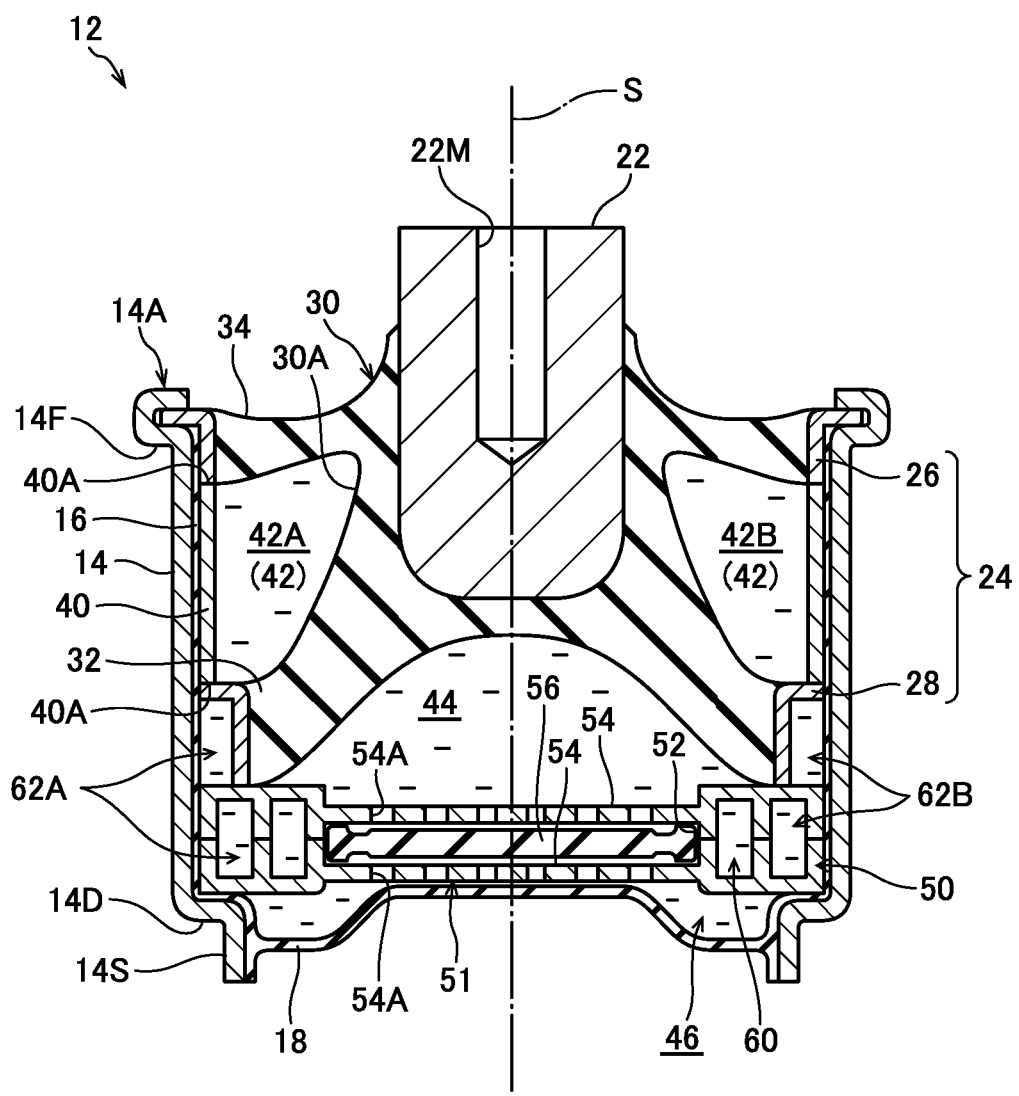
FIG. 1 is a cross-section taken along the axial direction illustrating a configuration of a vibration damping device according to a first exemplary embodiment of the present invention.

FIG. 1 to FIG. 5 illustrate a vibration damping device 12 of a first exemplary embodiment of the present invention. The vibration damping device 12 is for example employed as an engine mount in a vehicle, supporting an engine that acts as a vibration generation section on a vehicle body that acts as a vibration receiving section. Note that in the drawings, the letter S indicates the center axis of the vibration damping device 12. The direction of the axis S corresponds to the axial direction of the vibration damping device 12, and a direction orthogonal to the axis S (the axis orthogonal direction) corresponds to the radial direction of the vibration damping device 12. The vibration damping device 12 is disposed such that the direction of the axis S is in the main vibration input direction.

As shown in FIG. 2 to FIG. 5, the vibration damping device 12 includes a retaining member 14, an inside attachment member 22, an outer peripheral member 24, and a rubber elastic body 30.

The retaining member 14 is formed in a substantially circular cylinder shape. A small diameter portion 14S with the diameter reduced over a step portion 14D is formed to the retaining member 14 at a position below the cylinder axial direction center. The retaining member 14 is disposed such that the cylinder axial direction corresponds to the axis S. A substantially circular cylinder shaped rubber covering 16 is covered over substantially the entire inner peripheral face of the retaining member 14 by vulcanization bonding. A diaphragm 18 extends integrally towards the radial direction inside from the vicinity of a lower edge of the rubber covering 16.

The diaphragm 18 is a membranous member that curves such that the center thereof protrudes upwards, configuring an auxiliary liquid chamber 46 between the diaphragm 18 and a partitioning member 50, described later. The auxiliary liquid chamber 46 expands and contracts with deformation of the diaphragm 18, such that the volume of the auxiliary liquid chamber 46 changes.

The retaining member 14 is attached to the vehicle body through a bracket member, not shown in the drawings. As an example of the bracket member, the vibration damping device 12 may be attached to the vehicle body by inserting bolts through bolt insertion holes at the leading ends of plural leg portions that extend towards the radial direction outside of the cylinder shaped body.

The inside attachment member 22 is configured in a substantially circular columnar shape, and is disposed such that the circular columnar axial direction corresponds to the axis S. The inside attachment member 22 is formed with a female thread portion 22M that is aligned with the axis S and has an opening at an end face on a side projecting out from the retaining member 14. A bolt, for example, of a member coupled for example to an engine is screwed into the female thread portion 22M, supporting the engine on the vibration damping device 12. Note that although the vibration damping device 12 of the present exemplary embodiment exhibits the advantageous effect of attenuating axis orthogonal direction vibration, in a state in which vibration is not being input, the center axis of the inside attachment member 22 corresponds to the cylinder axis of the retaining member 14.

The outer peripheral member 24 is configured in a ring shape, and is divided along the axial direction into an upper outer peripheral member 26 and a lower outer peripheral member 28. The upper outer peripheral member 26 and the lower outer peripheral member 28 are configured with L-shaped cross-sections, disposed such that the open sides of the L-shape face downwards and towards the radial direction outside. The outer peripheral member 24 is disposed so as to enclose the outer periphery of the inside attachment member 22 as viewed along the axis S direction. The upper outer peripheral member 26 and the lower outer peripheral member 28 are disposed at a separation from each other in the axis S direction. The upper outer peripheral member 26 is disposed at an intermediate portion of the inside attachment member 22 in the axis S direction. The lower outer peripheral member 28 is disposed further to the outside than an end portion of the inside attachment member 22.

The rubber elastic body 30 is disposed between the inside attachment member 22 and the outer peripheral member 24, with the rubber elastic body 30 connecting together the inside attachment member 22 and the outer peripheral member 24. The rubber elastic body 30 includes a substantially circular conical shaped rubber main body portion 32 that increases in diameter as it extends from a lower side portion of the inside attachment member 22 (a portion at the side at which the opening of the female thread portion 22M is not formed) towards the lower outer peripheral member 28. Configuring in such a shape enables the volume of the rubber main body portion 32 to be increased, thereby causing a high vibration damping effect to be exhibited during elastic deformation, and enhancing durability.

The rubber elastic body 30 also includes a lid portion 34 that increases in diameter as it extends above the rubber main body portion 32 of the inside attachment member 22 towards the upper outer peripheral member 26. A recess portion 30A that is open towards the radial direction outside is configured between the rubber main body portion 32 and the lid portion 34. The recess portion 30A configures a liquid chamber 42 that is closed off by a positioning member 40, described later.

Figure 2:
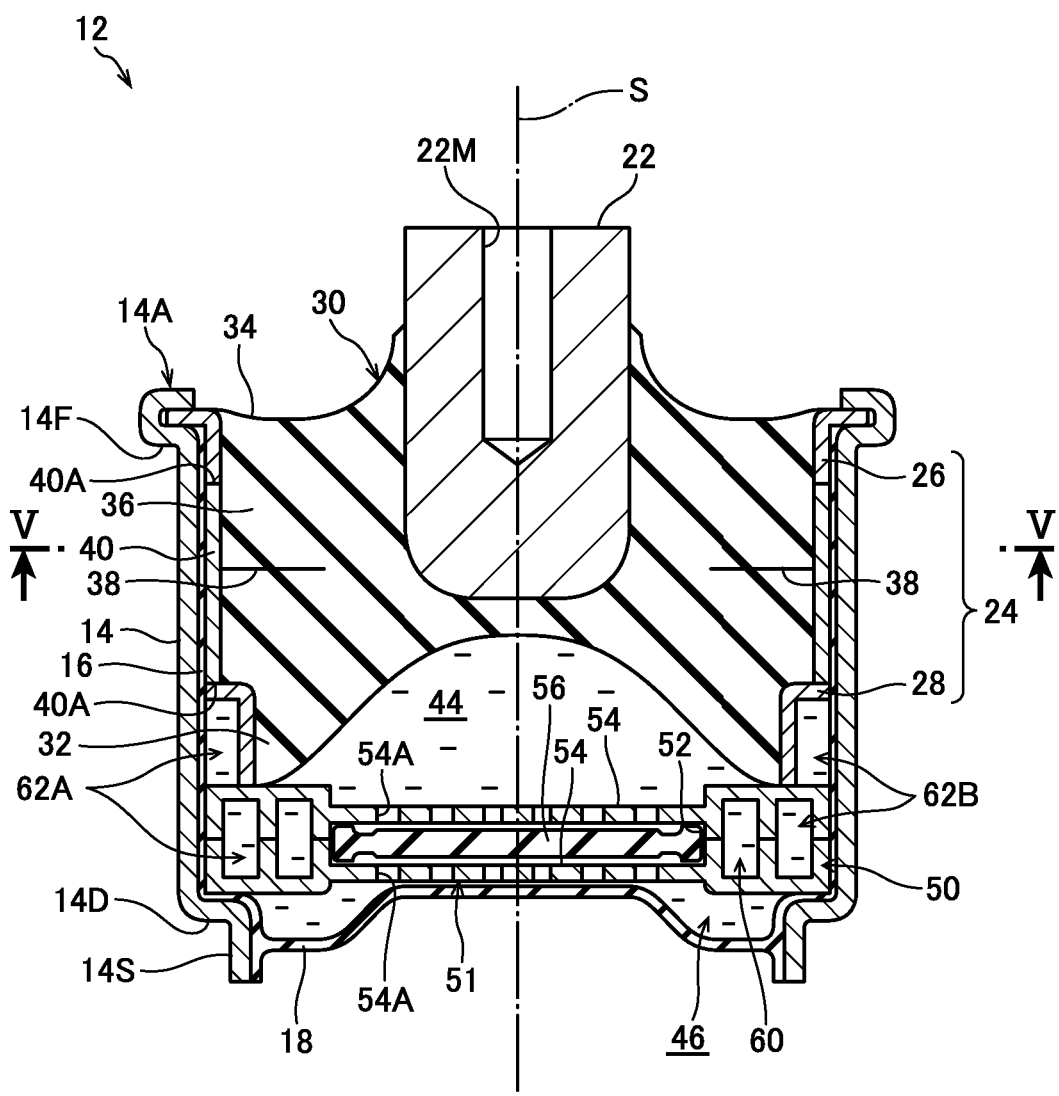
FIG. 2 is a cross-section taken along the axial direction at a different position to FIG. 1 and illustrating a vibration damping device according to the first exemplary embodiment of the present invention.
Figure 3:
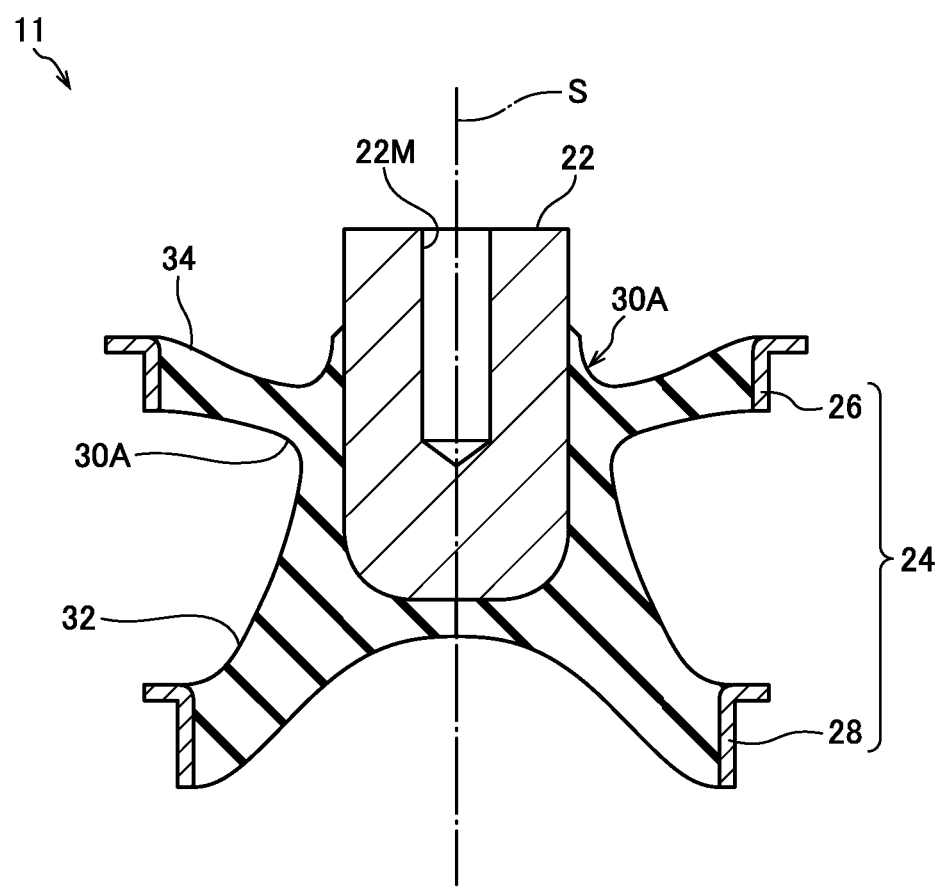
FIG. 3 is a cross-section taken along the axial direction illustrating a configuration of a main body portion of a vibration damping device according to the first exemplary embodiment of the present invention.
Figure 5:
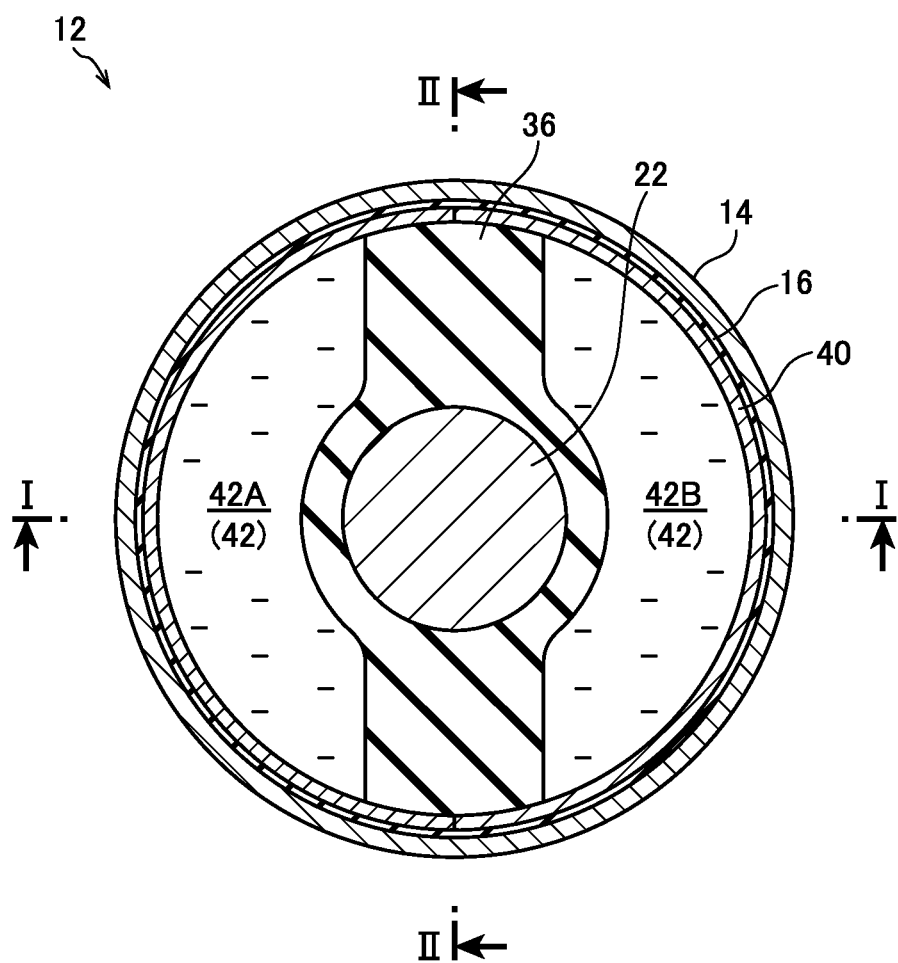
FIG. 5 is a cross-section taken along an axis orthogonal direction and illustrating a vibration damping device of a first exemplary embodiment of the present invention.
Figure 6:
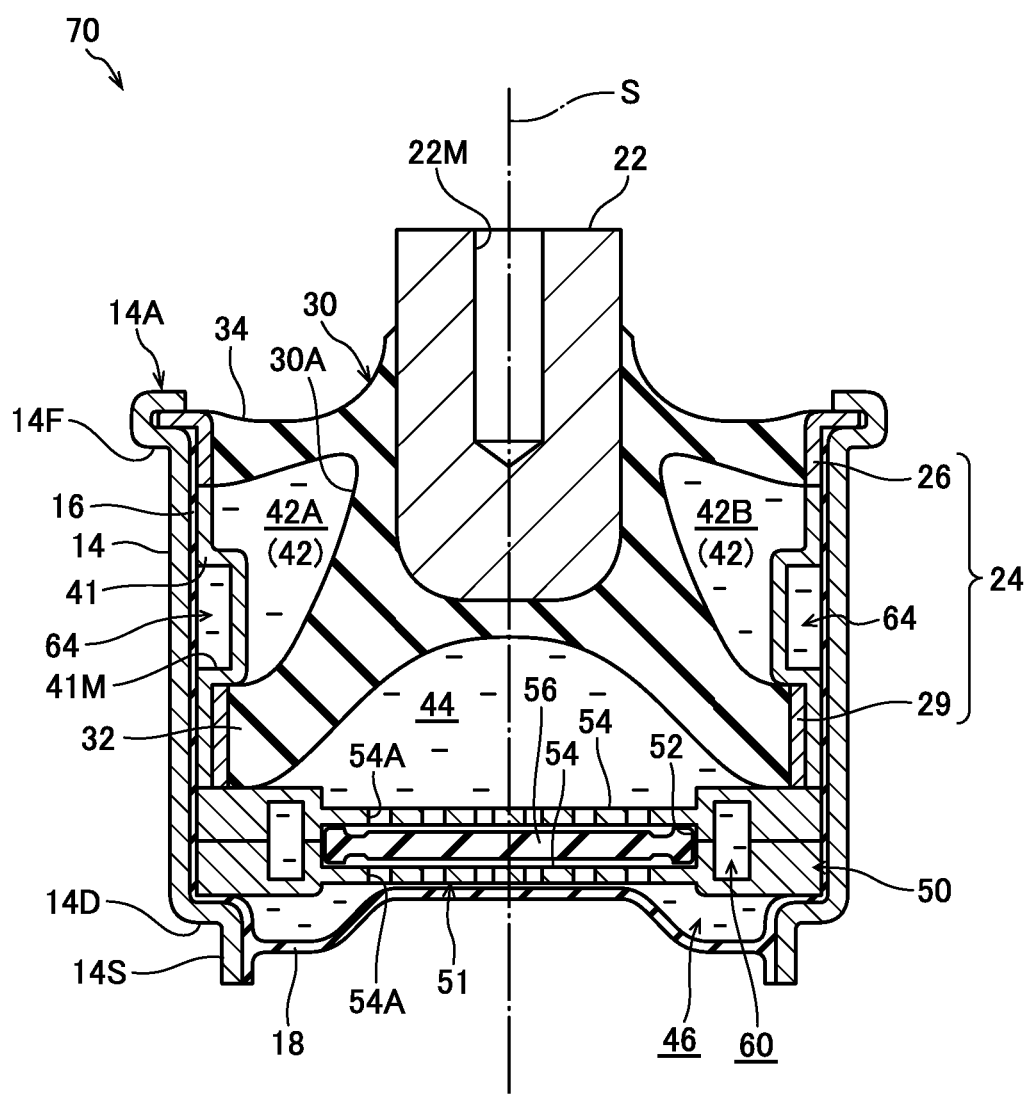
FIG. 6 is a cross-section taken along the axial direction illustrating a configuration of a vibration damping device according to a second exemplary embodiment of the present invention.
Figure 7:
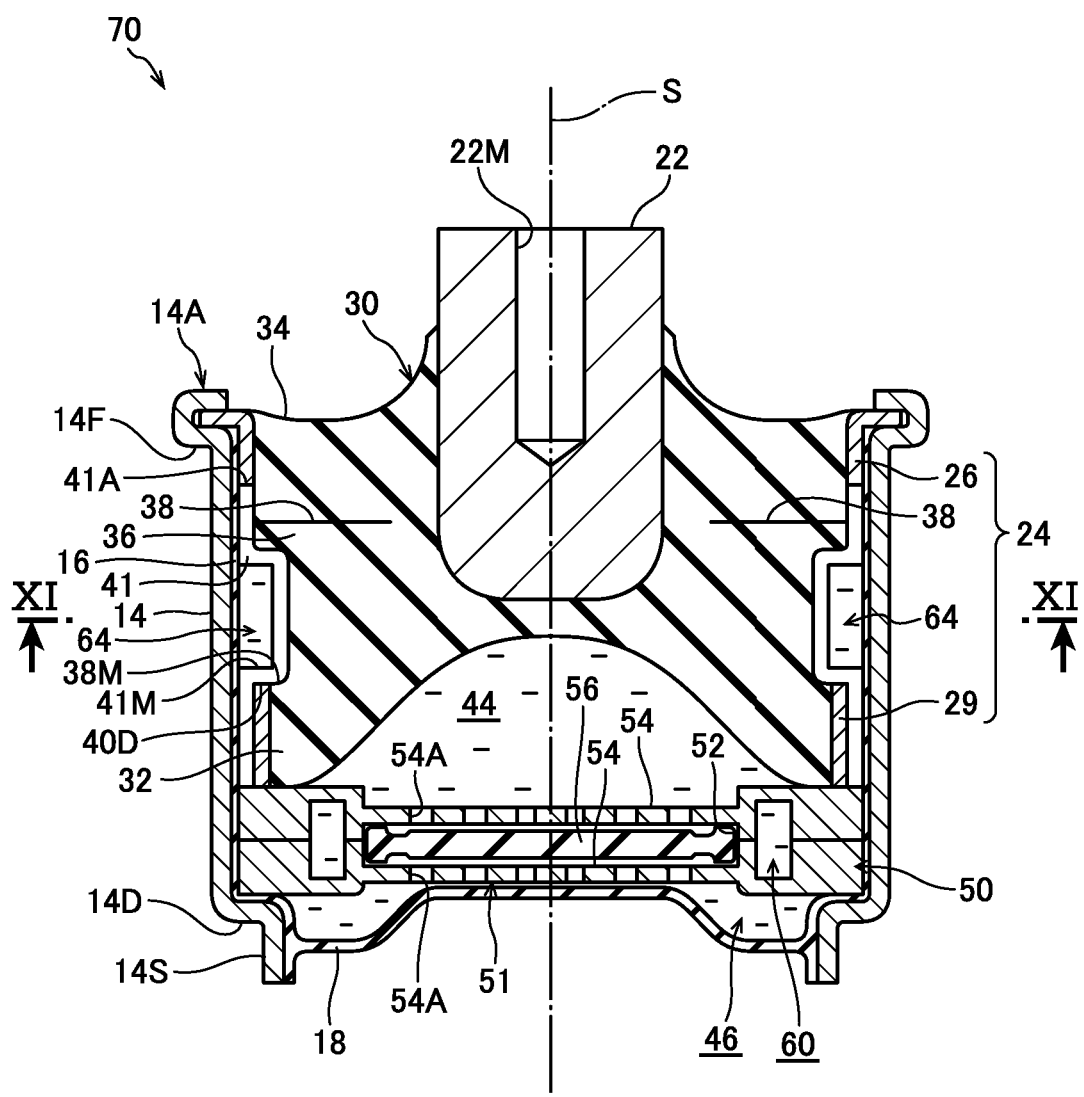
FIG. 7 is a cross-section taken along the axial direction at a different position to FIG. 6 and illustrating a vibration damping device according to the second exemplary embodiment of the present invention.
Figure 8:
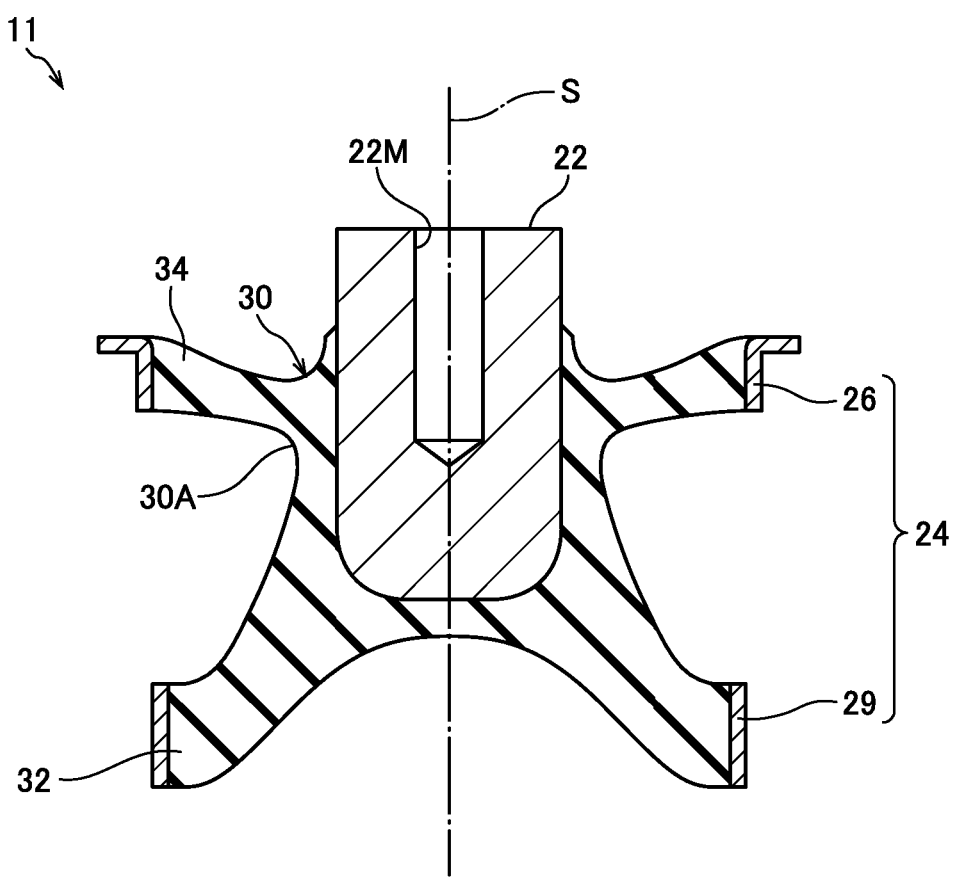
FIG. 8 is a cross-section taken along the axial direction illustrating a configuration of a main body portion of a vibration damping device according to the second exemplary embodiment of the present invention.
Figure 9:
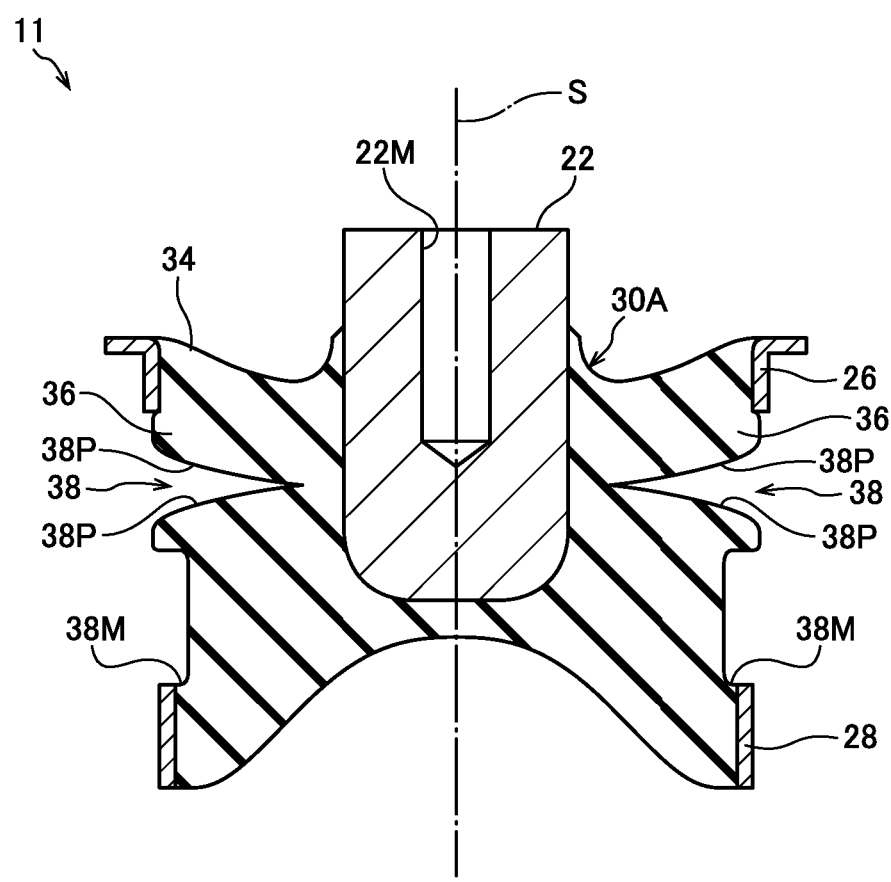
FIG. 9 is a cross-section taken along the axial direction at a different position to FIG. 8 and illustrating a main body portion of a vibration damping device according to the second exemplary embodiment of the present invention.

As shown in FIG. 2 and FIG. 5, two partitioning walls 36 that cut across the recess portion 30A in the axis orthogonal direction, from the inside attachment member 22 towards the radial direction outside, are formed between the rubber main body portion 32 and the lid portion 34. The partitioning walls 36 are formed with shapes symmetrical about the axis S, and continue integrally from the lid portion 34 as far as the rubber main body portion 32. The partitioning walls 36, the rubber main body portion 32 and the lid portion 34 are integrally vulcanization molded.

The partitioning walls 36 are formed with slits 38. As shown in FIG. 2, the slits 38 are formed between the upper outer peripheral member 26 and the lower outer peripheral member 28, along from outer peripheral faces towards the inside attachment member 22. The slits 38 extend along the circumferential direction so as to divide the partitioning walls 36 into upper outer peripheral member 26 sides and lower outer peripheral member 28 sides, and cut into the partitioning walls 36 from outer peripheral faces towards the radial direction inside. The slits 38 are preferably formed with a length that is ⅓ of the radial direction length of the partitioning walls 36 or greater.

The inside attachment member 22, the outer peripheral member 24, the rubber elastic body 30 and the partitioning walls 36 are assembled inside the cylinder of the retaining member 14.

The outer peripheral member 24 is disposed with the lower outer peripheral member 28 on the side nearest the small diameter portion 14S, and with both the upper outer peripheral member 26 and the lower outer peripheral member 28 disposed along the inner periphery of the retaining member 14. The side of the inside attachment member 22 formed with the opening of the female thread portion 22M projects out from the retaining member 14 in the axis S direction.

The positioning member 40 is disposed between the upper outer peripheral member 26 and the lower outer peripheral member 28 of the outer peripheral member 24. The positioning member 40 has a circular cylindrical shape and is divided into two around the circumferential direction. The external diameter of the positioning member 40 is set so as to be capable of making tight contact with the rubber covering 16 inside the retaining member 14. The positioning member 40 is disposed along the internal wall of the retaining member 14, and abuts outer peripheral portions of the partitioning walls 36.

Both axis S direction end faces 40A of the positioning member 40 respectively contact the upper outer peripheral member 26 and the lower outer peripheral member 28. The axis S direction length of the positioning member 40 is set such that when the positioning member 40 is in contact with the upper outer peripheral member 26 and the lower outer peripheral member 28, the partitioning walls 36 are compressed in the axis S direction and the upper and lower interfaces 38P of the slits 38 make tight contact with each other. Axis S direction positioning of the upper outer peripheral member 26 and the lower outer peripheral member 28 is performed by the positioning member 40.

One side of the L-shape of the upper outer peripheral member 26 projects towards the radial direction outside, and is fixed by swaging between the upper edge of the retaining member 14, configuring a swaged portion 14A. A leading end face of one side of the L-shape of the lower outer peripheral member 28 is abutted with the rubber covering 16, and the other side of the L-shape is disposed substantially parallel with, and at a separation to, the rubber covering 16. This separation portion configures a second restriction path 62, described later.

Figure 4:
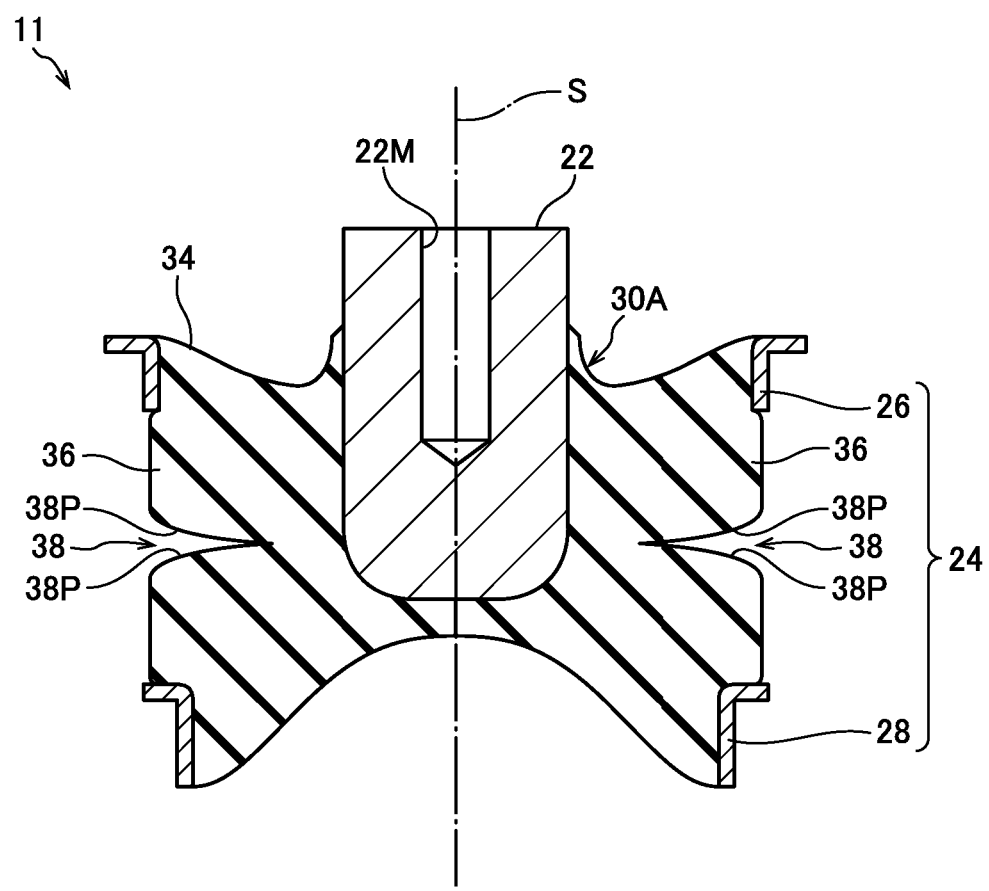
FIG. 4 is a cross-section taken along the axial direction at a different position to FIG. 3 and illustrating a main body portion of a vibration damping device according to the first exemplary embodiment of the present invention.

Due to the above assembly, the partitioning walls 36 transition from an open state of the slits 38, such as that shown in FIG. 4, to achieve a tightly contacting state of the interfaces 38P of the slits 38, compressed in the axis S direction, such as shown in FIG. 2. The outer peripheral faces of the partitioning walls 36 are placed in tight contact with the inner peripheral face of the positioning member 40, thereby partitioning the liquid chamber 42 into two second main liquid chambers 42A, 42B with the partitioning walls 36, as shown in FIG. 1 and FIG. 5.

The partitioning member 50 is disposed inside the cylinder of the retaining member 14 between the lower outer peripheral member 28 and the small diameter portion 14S. The partitioning member 50 partitions the space between the diaphragm 18 and the rubber main body portion 32 into two. A first main liquid chamber 44 is configured between the partitioning member 50 and the rubber main body portion 32. The first main liquid chamber 44 is filled with a liquid such as ethylene glycol or a silicone oil. An auxiliary liquid chamber 46 is configured between the partitioning member 50 and the diaphragm 18. Similarly to the first main liquid chamber 44, the auxiliary liquid chamber 46 is filled with a liquid such as ethylene glycol or a silicone oil. Configuring a portion of the auxiliary liquid chamber 46 by the diaphragm 18 enables the auxiliary liquid chamber 46 to achieve an internal pressure state close to atmospheric pressure (by causing liquid to flow in or flow out) by deformation of the diaphragm 18.

The partitioning member 50 is configured in a substantially circular plate shape of thick thickness, and is configured by joining together two axial direction divided upper and lower pieces. A central path 51 is configured at a central portion of the partitioning member 50. The central path 51 is configured with a circular plate shaped movable plate 56 disposed in an opening hole 52 penetrating through in the thickness direction, and a pair of lid plate portions 54 covering both ends of the opening hole 52. The lid plate portions 54 are configured with plural communication holes 54A and the movable plate 56 is configured so as to be capable of vibrating between the pair of lid plate portions 54. The diameter of the central path 51 and positions of the communication holes 54A are, for example, set to correspond to vibrations of a specific frequency range (for example idling vibration).

A first restriction path 60 extending in the circumferential direction is configured at the radial direction outside of the opening hole 52. One end of the first restriction path 60 is in communication with the first main liquid chamber 44, and the other end is in communication with the auxiliary liquid chamber 46, thereby configuring a flow path that permits movement of liquid between the first main liquid chamber 44 and the auxiliary liquid chamber 46. The path length and cross-sectional area of the first restriction path 60 are set to correspond to vibrations of a specific frequency range (for example a shake vibration). Namely, regulation is made such that a vibration damping effect can be exhibited by liquid column resonance inside the first restriction path 60 induced by the movement of liquid between the first main liquid chamber 44 and the auxiliary liquid chamber 46 when vibration at a specific frequency range occurs.

Second restriction paths 62A, 62B that extend in the circumferential direction are configured to the radial direction outside of the first restriction path 60. A first end of the second restriction path 62A is in communication with the auxiliary liquid chamber 46, the second restriction path 62A passes between the lower outer peripheral member 28 and the rubber covering 16, and the other end of the second restriction path 62A is in communication with the second main liquid chamber 42A. A flow path permitting the movement of liquid between the second main liquid chamber 42A and the auxiliary liquid chamber 46 is thereby achieved. A first end of the second restriction path 62B is in communication with the auxiliary liquid chamber 46, the second restriction path 62B passes between the lower outer peripheral member 28 and the rubber covering 16, and the other end of the second restriction path 62A is in communication with the second main liquid chamber 42B. A flow path permitting the movement of liquid between the second main liquid chamber 42B and the auxiliary liquid chamber 46 is thereby achieved. The path length and cross-sectional area of the second restriction paths 62A, 62B are set to correspond to vibrations of a specific frequency range (for example, a frequency slightly lower than a shake vibration). Namely, regulation is made such that a vibration damping effect can be exhibited due to liquid column resonance in the second restriction path 62 induced by movement of liquid between the second main liquid chamber 42A and the auxiliary liquid chamber 46 and between the second main liquid chamber 42B and the auxiliary liquid chamber 46 when vibration at a specific frequency range occurs.

Explanation follows regarding a manufacturing process of the vibration damping device 12.

Firstly, the inside attachment member 22 and the outer peripheral member 24 (upper outer peripheral member 26, lower outer peripheral member 28) are placed in a mold, and green rubber is poured into the mold and vulcanization treatment performed so as to integrally forming the rubber main body portion 32, the lid portion 34 and the partitioning walls 36. The thus formed members configure a main body portion 11 (see FIG. 3 and FIG. 4). The retaining member 14 is then placed in a mold, green rubber is poured into the mold and vulcanization treatment performed, integrally forming the rubber covering 16 and the diaphragm 18. The movable plate 56 is placed in the partitioning member 50, and the divided top and bottom pieces are joined.

Then the partitioning member 50 incorporating the movable plate 56 is inserted into the retaining member 14. The partitioning member 50 is positioned by an outer peripheral portion of the partitioning member 50 being placed in contact with the step portion 14D.

Next, the positioning member 40 is assembled between the upper outer peripheral member 26 and the lower outer peripheral member 28 of the main body portion 11, and the main body portion 11 is push-fitted into the retaining member 14 from the lower outer peripheral member 28 side, and the lower outer peripheral member 28 placed in contact with the partitioning member 50. A lower end face of the upper outer peripheral member 26 is placed in contact with the end face 40A of the positioning member 40, and the lower face of the portion of the upper outer peripheral member 26 that projects out towards the radial direction outside is placed in contact with a flange 14F of the retaining member 14. A leading end of the flange 14F is bent towards the radial direction inside so as to cover the leading end of the upper outer peripheral member 26, and is fixed by swaging. During swaging, the partitioning walls 36 are compressed in the axis S direction, applying overall precompression. The interfaces 38P of the slits 38 are brought into tight contact with each other such the gap between them disappears completely.

Note that the liquid to be filled inside is prepared and this assembly operation is performed submerged in the liquid. The liquid can accordingly be filled into the first main liquid chamber 44, the second main liquid chamber 42, the auxiliary liquid chamber 46, the first restriction path 60 and the second restriction path 62.

The vibration damping device 12 can be manufactured as described above.

Explanation follows regarding operation of the vibration damping device 12 according to the present exemplary embodiment configured as described above. In the vibration damping device 12, when the engine coupled to the inside attachment member 22 is actuated, vibration from the engine is transmitted through the inside attachment member 22 to the rubber main body portion 32. When this occurs, the rubber main body portion 32 acts as a vibration absorption main body, and the input vibration is absorbed by vibration absorption action due to for example internal friction accompanying deformation of the rubber main body portion 32.

Note that the main vibrations input from the engine include for example vibration (main vibration) generated by the back and forth movement of the pistons inside their cylinders in the engine, and vibration (secondary vibration) generated by changes to the rotation speed of the crankshaft in the engine. With a straight engine, the amplitude direction of the main vibration (main amplitude direction) is substantially the same direction as the vehicle top-bottom direction, and the amplitude direction of the secondary vibration (secondary amplitude direction) is substantially the same direction as the vehicle front-rear direction (for a transverse mounted engine), or the vehicle left-right direction orthogonal to the amplitude direction of the main vibration (for a longitudinal mounted engine). A portion of the vibration can be absorbed by the vibration absorption action of the rubber main body portion 32 regardless of whether the input vibration is a main vibration along the main amplitude direction, or a secondary vibration along the secondary amplitude direction.

In the vibration damping device 12, the first main liquid chamber 44 and the auxiliary liquid chamber 46 are in communication with each other through the first restriction path 60. Accordingly, when main vibration along the main amplitude direction is input to the vibration damping device 12, the rubber main body portion 32 elastically deforms along the axis S direction. This causes the internal volume of the first main liquid chamber 44 to expand and contract, and liquid to flow between the first main liquid chamber 44 and the auxiliary liquid chamber 46 through the first restriction path 60.

When this occurs, the path length and the cross-sectional area of the first restriction path 60, that is to say the resistance to flow of the liquid, is set (tuned) so as to be adapted for a specific frequency range (such as the frequency of shake vibration). Therefore, when the input main vibration falls within the specific frequency range, resonance (liquid column resonance) occurs in the liquid that is flowing through the first restriction path 60 between the first main liquid chamber 44 and the auxiliary liquid chamber 46 in synchronization with the shake vibration, enabling a vibration damping effect to be effectively exhibited.

Moreover, in the vibration damping device 12, the second main liquid chambers 42A, 42B are respectively in communication with the auxiliary liquid chamber 46 through the second restriction paths 62A, 62B. Accordingly, when vibration is input to the vibration damping device 12 along the axis orthogonal direction, the partitioning walls 36 and the rubber main body portion 32 elastically deform along the axis orthogonal direction. This causes the internal volume of the second main liquid chambers 42A, 42B to expand and contract, and liquid to flow between the second main liquid chambers 42A, 42B and the auxiliary liquid chamber 46 through the second restriction paths 62A, 62B.

Note that the path length and the cross-sectional area of the second restriction paths 62A, 62B, that is to say the resistance to flow of the liquid, is set (tuned) so as to be adapted for a specific frequency range (such as a slightly lower frequency than shake vibration). Therefore, when the input secondary vibration is vibration with a frequency falling within this range, resonance (liquid column resonance) occurs in the liquid that is flowing between the second main liquid chambers 42A, 42B and the auxiliary liquid chamber 46 through the second restriction paths 62A, 62B in synchronization with the input secondary vibration, enabling a vibration damping effect to be effectively exhibited.

In the vibration damping device 12 of the present exemplary embodiment, the slits 38 are formed in the partitioning walls 36. Therefore, when vibration is input to the vibration damping device 12, the portions of the partitioning walls 36 to the upper side and the lower side of the slits 38 do not pull each other, therefore one portion does not readily negatively impact the other. The partitioning walls 36 accordingly deform relatively freely, alleviating concentration of stress, and enabling an increase in the durability of the partitioning walls 36 to be achieved. The partitioning walls 36 are moreover integrally formed to the rubber main body portion 32, enabling a simpler configuration and enabling manufacturing costs to be kept down in comparison to cases in which partitioning walls are configured as separate components to a rubber main body portion.

Second Exemplary Embodiment

Explanation follows regarding a second exemplary embodiment of the present invention. In the present exemplary embodiment, elements similar to those of the first exemplary embodiment are illustrated using the same reference numerals (FIG. 6 to FIG. 10) and detailed explanation thereof is omitted.

As shown in FIG. 6 to FIG. 9, a vibration damping device 70 of the present exemplary embodiment is configured without the cross-sectional L-shaped outer peripheral member 24 of the lower outer peripheral member 28 of the first exemplary embodiment, but is instead configured with an I-shaped cross-section, that is to say, as a straight line-shaped ring (lower outer peripheral member 29). Moreover, a positioning flow path member 41 is employed in place of the positioning member 40 of the first exemplary embodiment. Partitioning walls 36 are configured with a groove 36M corresponding to a recessed groove 41M, described later.

The positioning flow path member 41 is configured in a substantially circular cylinder shape, divided into two in the circumferential direction. The outer diameter of the positioning flow path member 41 is set so as to be capable of tightly contacting a rubber covering 16 on the inside of a retaining member 14. The positioning flow path member 41 is disposed along the internal wall of the retaining member 14, and is abutted by outer peripheral portions of the partitioning walls 36, with the recessed groove 41M fitting into the groove 36M. The outer periphery of the positioning flow path member 41 configures the recessed groove 41M along the circumferential direction. A step portion 41D is formed at a lower side of a portion that protrudes inwards in the radial direction due to the recessed groove 41M. A lower outer peripheral member 29 is disposed to the inner periphery of the positioning flow path member 41 below the recessed groove 41M. An upper end face of the lower outer peripheral member 29 is in contact with the step portion 41D. A lower end face of an upper outer peripheral member 26 is in contact with a top end face 41A of the positioning flow path member 41. The axis S direction length of the positioning flow path member 41 is set such that when the upper outer peripheral member 26 and the lower outer peripheral member 29 are assembled as described above, the partitioning walls 36 are compressed along the axis S direction, bringing upper and lower interfaces 38P of slits 38 into tight contact. Axis S direction positioning of the upper outer peripheral member 26 and the lower outer peripheral member 29 is performed by the positioning flow path member 41.

Figure 10:
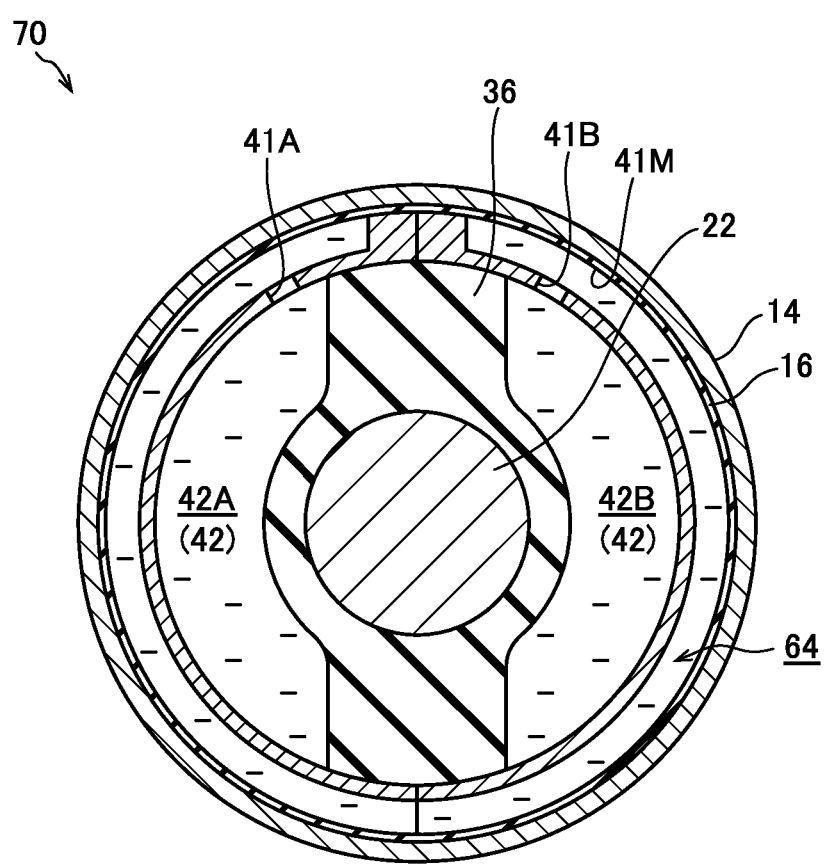
FIG. 10 is a cross-section taken along an axis orthogonal direction illustrating a vibration damping device according to the second exemplary embodiment of the present invention.

As shown in FIG. 10, in the present exemplary embodiment a second restriction path 64 is formed in place of the second restriction paths 62A, 62B of the first exemplary embodiment. The second restriction path 64 is configured between the recessed groove 41M and the rubber covering 16, and has a first end that is in communication with a second main liquid chamber 42A at a communication opening 41A and the other end in communication with a second main liquid chamber 42B at a communication opening 41B. A flow path that permits the movement of liquid between the second main liquid chamber 42A and the second main liquid chamber 42B is configured thereby. The path length and cross-sectional area of the second restriction path 64 are set to correspond to vibrations of a specific frequency range (for example a frequency slightly lower than that of a shake vibration). Namely, regulation is made such that vibration damping effects can be exhibited due to liquid column resonance inside the second restriction path 64 induced by the movement of liquid between the second main liquid chambers 42A, 42B when vibration of a specific frequency range occurs.

In the vibration damping device 70 of the present exemplary embodiment, the partitioning walls 36 are formed with the slits 38. Therefore, when vibration is input to the vibration damping device 70, portions of the partitioning walls 36 to the upper side and the lower side of the slits 38 do not pull each other, and one does not readily negatively impact the other. The partitioning walls 36 accordingly deform relatively freely, alleviating concentration of stress, and enabling an increase in the durability of the partitioning walls 36 to be achieved.

In the vibration damping device 70 of the present exemplary embodiment, since the second main liquid chamber 42A and the second main liquid chamber 42B are in communication with each other by the second restriction path 64, a vibration damping effect can be obtained due to the flow of liquid mainly between the second main liquid chambers 42A, 42B when secondary vibration is input.

Moreover, the vibration damping device 12 of the second exemplary embodiment is configured with the second main liquid chambers 42A, 42B in communication with the auxiliary liquid chamber 46. However configuration may be made with the second main liquid chambers 42A, 42B in communication with each other, or with the second main liquid chambers 42A, 42B in communication with the auxiliary liquid chamber 46 and the second main liquid chambers 42A, 42B also in communication with each other.

In the present exemplary embodiment, only the lower outer peripheral member 29 is disposed at the inside of the positioning flow path member 41, however the upper outer peripheral member 26 may also be disposed to the inside of the positioning flow path member 41.

Third Exemplary Embodiment

Explanation follows regarding a third exemplary embodiment of the present invention. In the present exemplary embodiment, elements similar to those of the first and second exemplary embodiments are illustrated using the same reference numerals (FIG. 11 to FIG. 15) and detailed explanation thereof is omitted.

Figure 11:
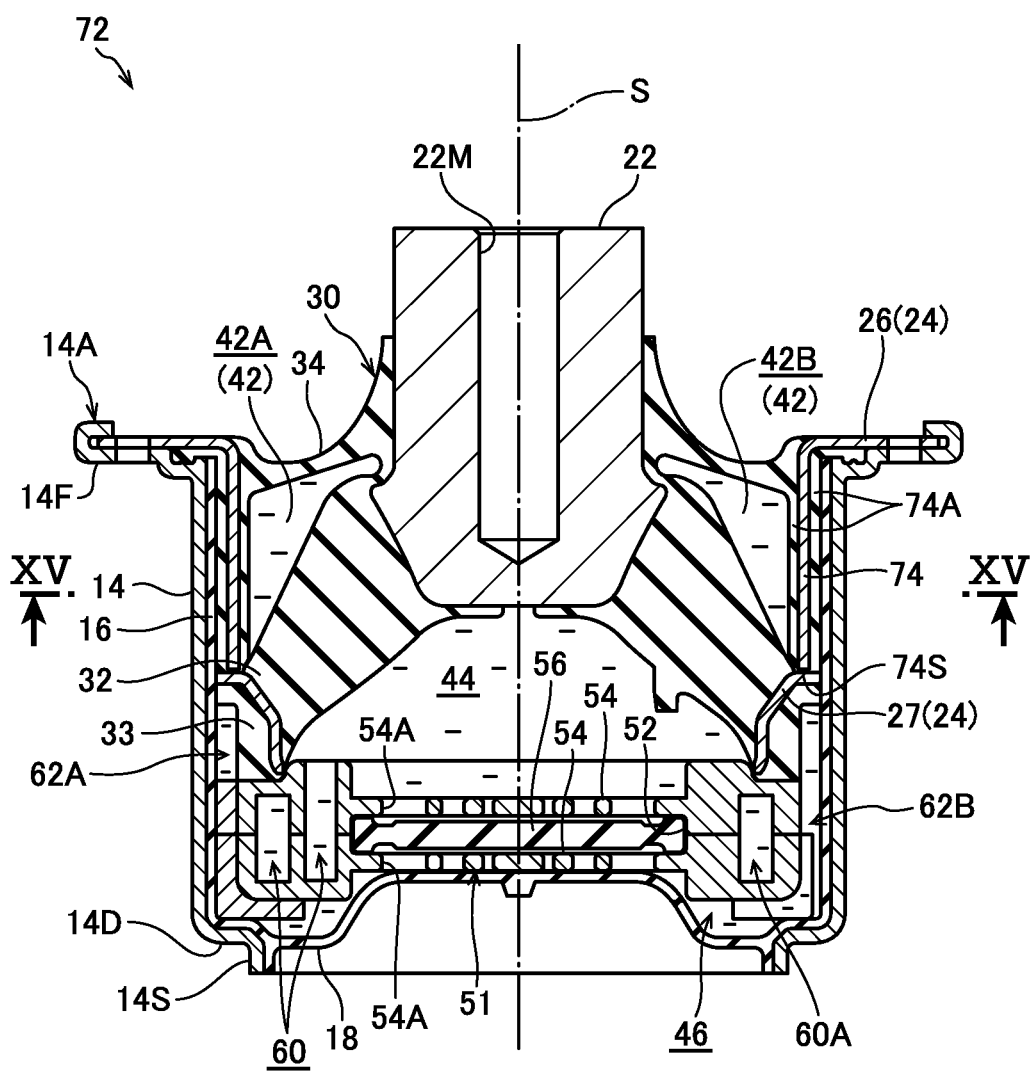
FIG. 11 is a cross-section taken along the axial direction illustrating a configuration of a vibration damping device according to a third exemplary embodiment of the present invention.
Figure 12:
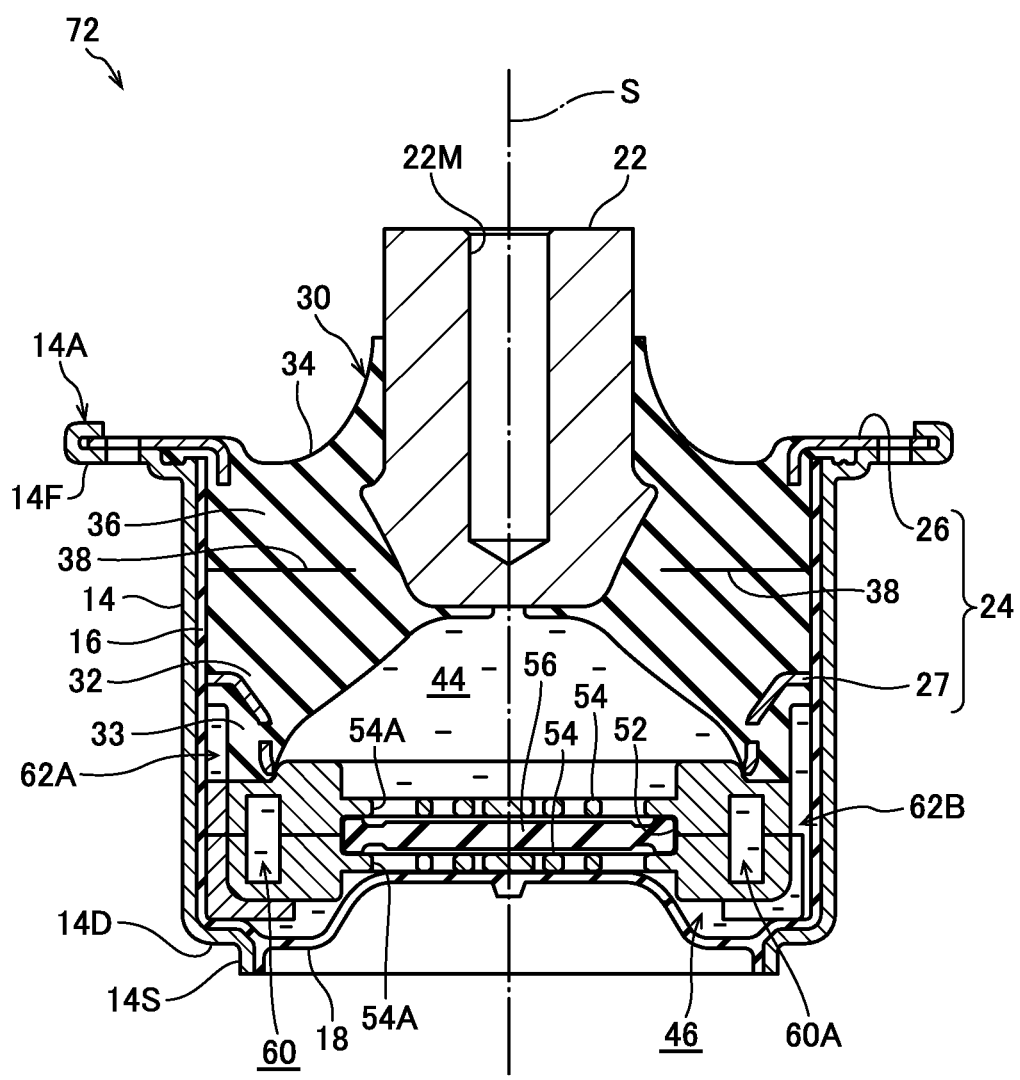
FIG. 12 is a cross-section taken along the axial direction at a different position to FIG. 11 and illustrating a vibration damping device according to the third exemplary embodiment of the present invention.
Figure 13:
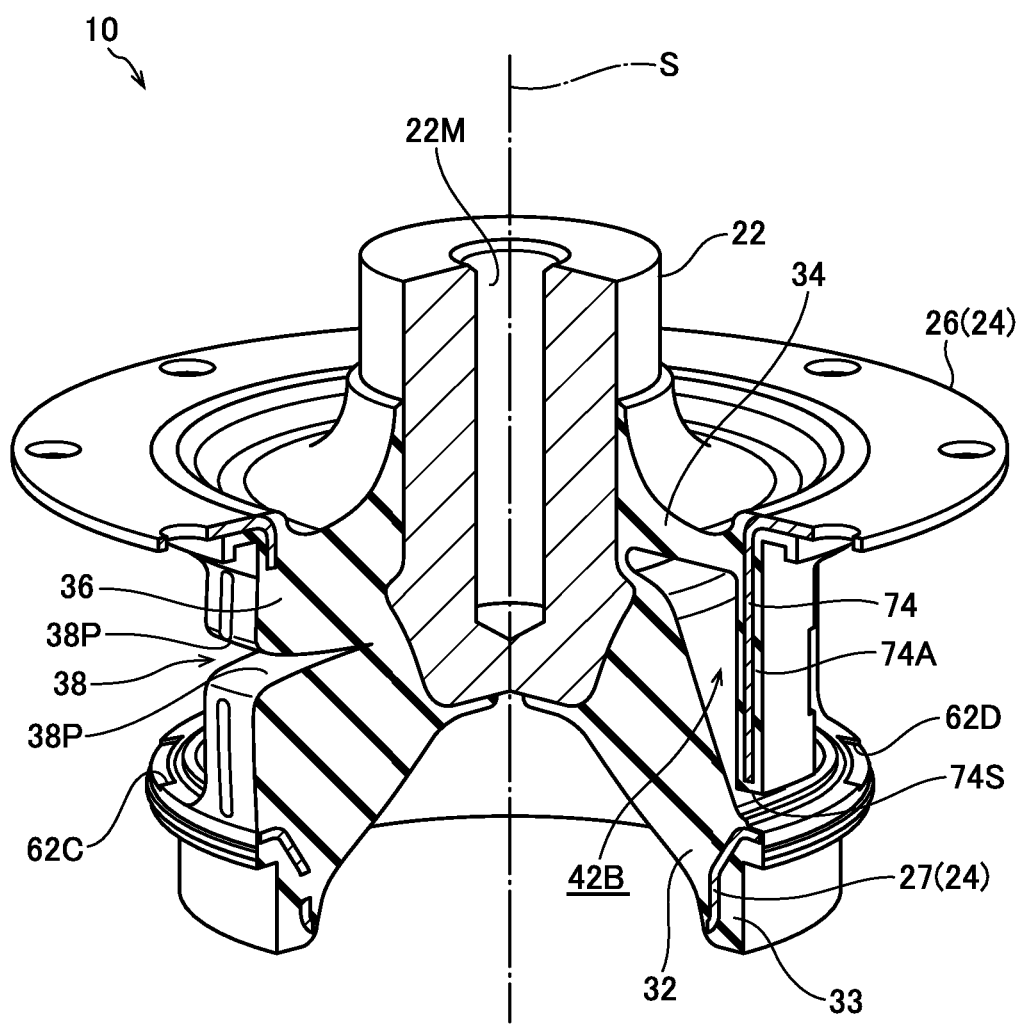
FIG. 13 is a perspective view illustrating a configuration of a vibration damping device according to the third exemplary embodiment of the present invention, partially cut-away along the axial direction.

As shown in FIG. 11 and FIG. 12, a vibration damping device 72 of the present exemplary embodiment is provided with a lower outer peripheral member 27 of which an L-shaped bent portion is beveled into a taper shape in place of the lower outer peripheral member 28 of the outer peripheral member 24 of the first exemplary embodiment. A groove portion 33M configured by a rubber material 33 is configured at the outside of the lower outer peripheral member 27, and second restriction paths 62A, 62B are formed between the lower outer peripheral member 27 and a rubber covering 16. The rubber material 33 is integrally formed to a rubber main body portion 32.

The vibration damping device 72 is not provided with the positioning member 40 of the first exemplary embodiment, however extension portions 74 are formed to an upper outer peripheral member 26, and the extension portion 74 functions as a positioning member. The extension portion 74 extends along the axis S towards the lower outer peripheral member 27 from intermediate portions of the upper outer peripheral member 26 corresponding to second main liquid chambers 42A, 42B as viewed along the axis S direction. The extension portions 74 are integrally formed to the upper outer peripheral member 26, and are covered over their entire surface with rubber membranes 74A. In a non-assembled state of the outer peripheral member 24 to a retaining member 14, a leading end portion 74A of each of the extension portions 74 is separated by a separation distance S from the lower outer peripheral member 27. In an assembled state of the outer peripheral member 24 to the retaining member 14, the leading end portions 74A contact the lower outer peripheral member 27. The separation distance S is set such that upper and lower interfaces 38P of slits 38 make tight contact with each other when partitioning walls 36 are compressed in the axis S direction. The extension portion 74 performs axis S direction positioning of the upper outer peripheral member 26 and the lower outer peripheral member 27. The leading end portion 74S of the extension portion 74 contacts the lower outer peripheral member 27, thereby compressing the partitioning walls 36 by the separation distance S and placing the upper and lower interfaces 38P of the slits 38 in tight contact with each other, and partitioning the second main liquid chambers 42A, 42B.

Figure 14:
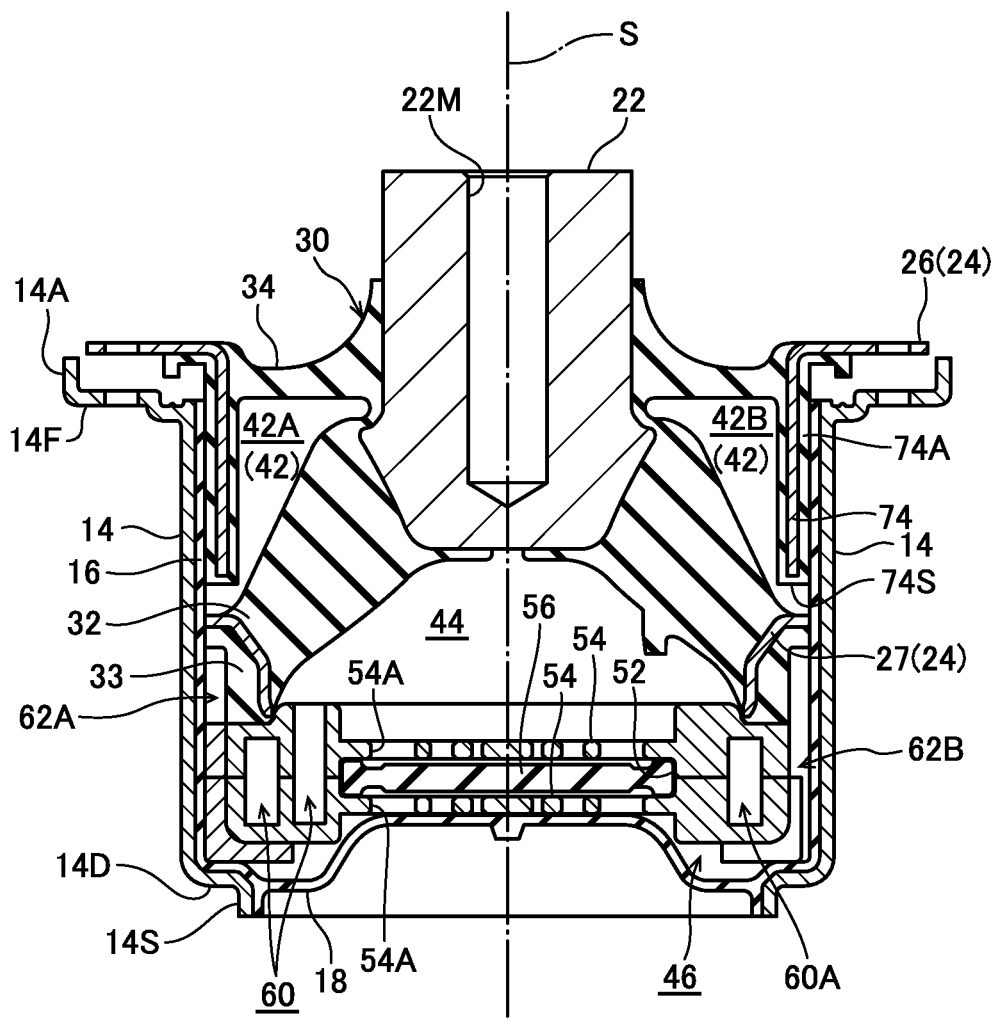
FIG. 14 is a cross-section taken along the axial direction, illustrating a configuration prior to performing axial direction positioning of a main body portion of a vibration damping device according to the third exemplary embodiment of the present invention.
Figure 15:
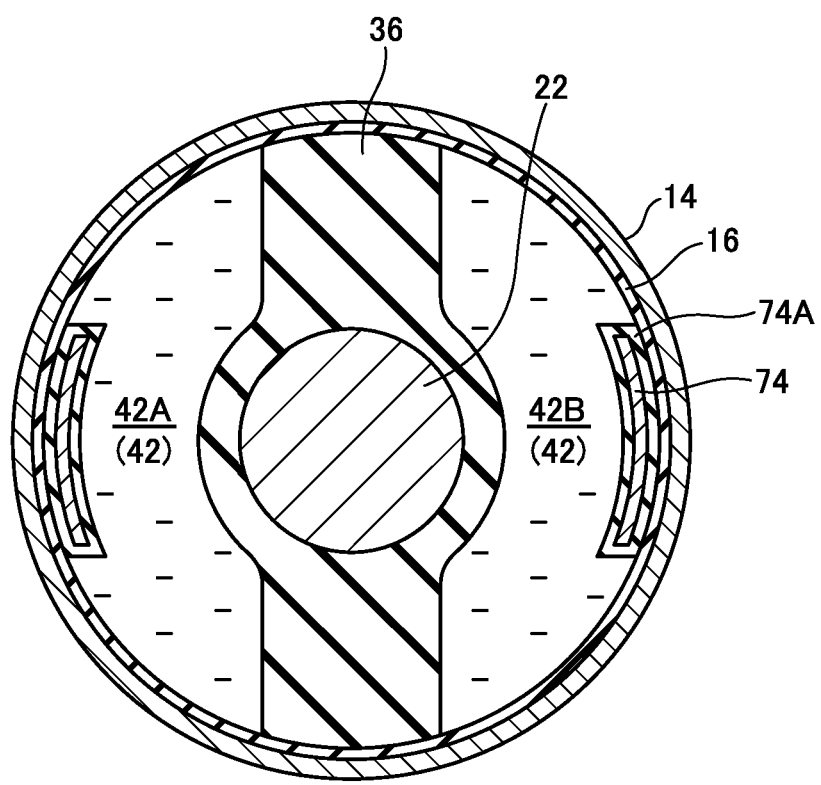
FIG. 15 is a cross-section taken along the axis orthogonal direction of a vibration damping device according to the third exemplary embodiment of the present invention.

Moreover, in the present exemplary embodiment, as shown in FIG. 14, a lid portion 34 is configured with a shape with an outer face extending in the axis orthogonal direction prior to assembly to the retaining member 14. As shown in FIG. 11, when the lid portion 34 is assembled to the retaining member 14, the outer face of the lid portion 34 takes on a shape sloping downwards towards the radial direction outside (the upper outer peripheral member 26 side).

A first end of the second restriction path 62A is in communication with an auxiliary liquid chamber 46 through a communication hole 62C (see FIG. 13), with the second main liquid chamber 42A in communication with the auxiliary liquid chamber 46 through the second restriction path 62A. A first end of the second restriction path 62B is in communication with the auxiliary liquid chamber 46 through a communication hole 62D (see FIG. 13), with the second main liquid chamber 42B in communication with the auxiliary liquid chamber 46 through the second restriction path 62B. A first restriction path 60 is in communication with a first main liquid chamber 44 at a communication portion 60C, with the first main liquid chamber 44 in communication with the auxiliary liquid chamber 46 through the first restriction path 60.

Explanation follows regarding a manufacturing process of the vibration damping device 72.

Firstly, the inside attachment member 22 and the outer peripheral member 24 (upper outer peripheral member 26, lower outer peripheral member 27) are placed inside a mold, green rubber is poured into the mold, and vulcanization processing is performed, thereby integrally forming the rubber main body portion 32, the lid portion 34 and the partitioning walls 36. The thus formed members configure a main body portion 10 (see FIG. 13). Then, similarly to in the first exemplary embodiment, the retaining member 14 is integrally vulcanize-formed with a rubber covering 16 and a diaphragm 18, and a movable plate 56 is placed in a partitioning member 50, and top and bottom pieces are joined together.

Next, the partitioning member 50 incorporating the movable plate 56 is inserted inside the retaining member 14, and the outer peripheral portion of the partitioning member 50 is positioned by placing in contact with a step portion 14D.

Next, the main body portion 10 is push-fitted into the retaining member 14 from the lower outer peripheral member 27 side, and the lower outer peripheral member 27 is placed in contact with the partitioning member 50 (see FIG. 14). The leading end portion 74S of the extension portion 74 extending from the upper outer peripheral member 26 are placed in contact with the lower outer peripheral member 27. The leading edge of the flange 14F of the retaining member 14 is bent towards the radial direction inside so as to cover the leading edge of the upper outer peripheral member 26, and is fixed by swaging. During swaging, the partitioning walls 36 are compressed in the axis S direction, applying overall precompression. The interfaces 38P of the slits 38 are accordingly placed in tight contact with each other such the gap between them disappears completely. Similarly to in the first exemplary embodiment, this assembly operation is performed submerged in liquid. The vibration damping device 72 can be manufactured as described above.

In the present exemplary embodiment, the axis S direction positioning of the upper outer peripheral member 26 and the lower outer peripheral member 27 is performed by the extension portion 74. Simple manufacture can be performed since the extension portions 74 are integrally formed to the upper outer peripheral member 26, obviating the need to assemble and position separate components.

In the present exemplary embodiment, the extension portions 74 are integrally formed to the upper outer peripheral member 26, however the extension portion 74 may also be integrally formed to the lower outer peripheral member 27, or the extension portion 74 may be formed to both the upper outer peripheral member 26 and the lower outer peripheral member 27.

Figure 16:
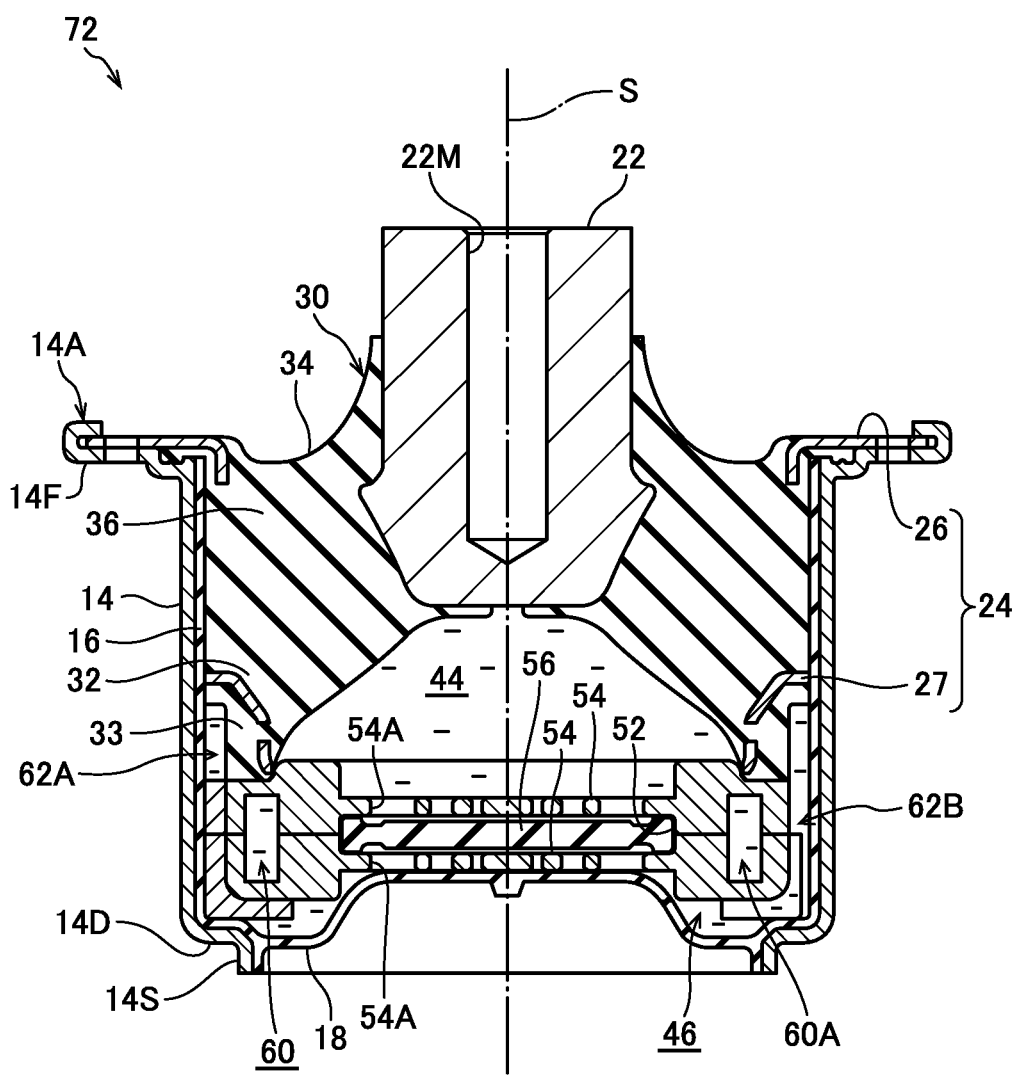
FIG. 16 is a cross-section taken along the axial direction of a vibration damping device according to a modified example of the third exemplary embodiment of the present invention.
Figure 17:
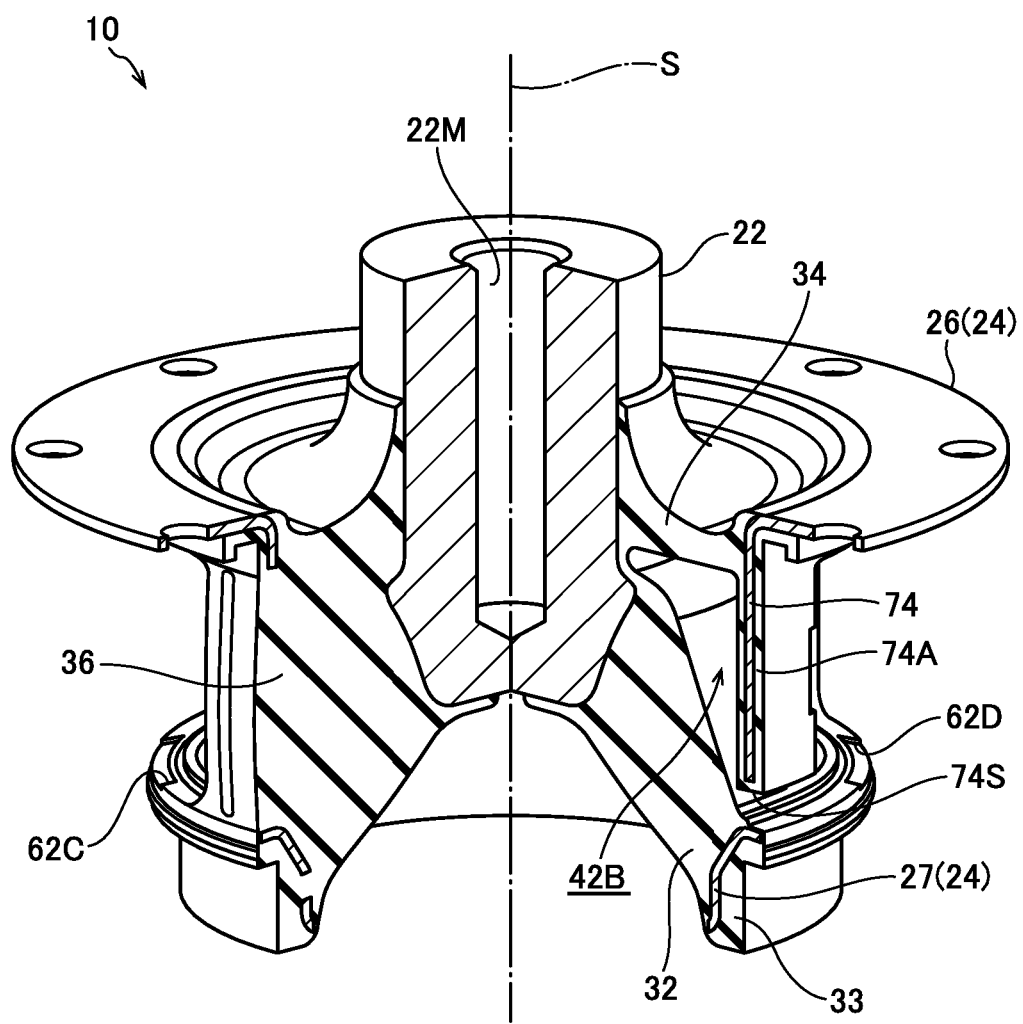
FIG. 17 is a perspective view illustrating a configuration of the vibration damping device shown in FIG. 16, partially cut-away along the axial direction.

Moreover, in the present exemplary embodiment, the slits 38 are formed to the partitioning walls 36, however as shown in FIG. 16 and FIG. 17, configuration may be made in which the slits 38 are not formed. In such cases, the upper outer peripheral member 26 and the lower outer peripheral member 27 are positioned by the extension portion 74 such that the upper outer peripheral member 26 and the lower outer peripheral member 27 are retained inside the retaining member 14 in a precompressed state with the partitioning walls 36 compressed in the axis S direction.

Note that a configuration in which the slits 38 are not formed is also possible for the partitioning walls 36 of the first and second exemplary embodiments.

Fourth Exemplary Embodiment

Explanation follows regarding a vibration damping device according to a fourth exemplary embodiment of the present invention with reference to the drawings.

Figure 18:
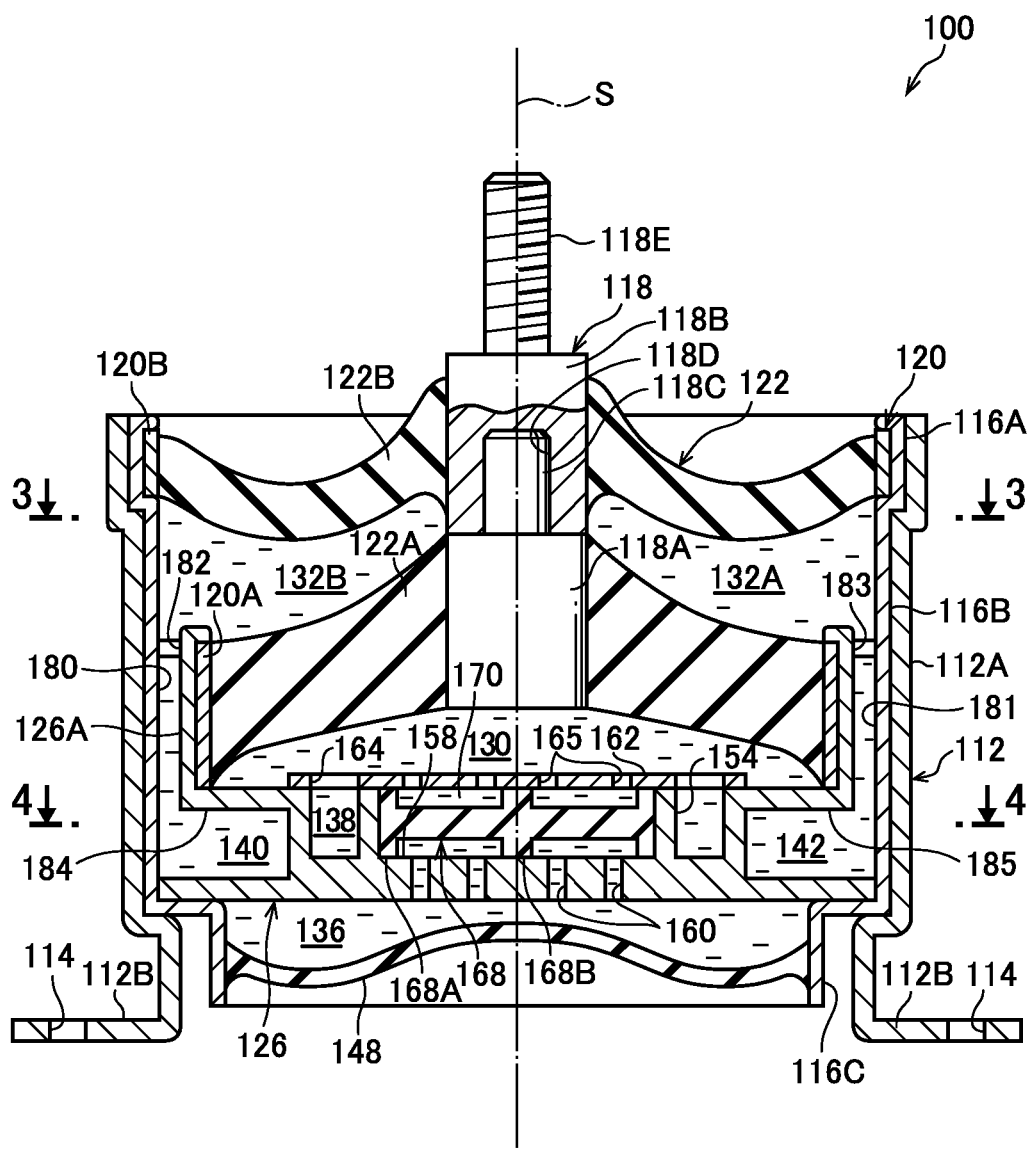
FIG. 18 is a cross-section taken along the axial direction illustrating a configuration of a vibration damping device according to a fourth exemplary embodiment of the present invention.
Figure 19:
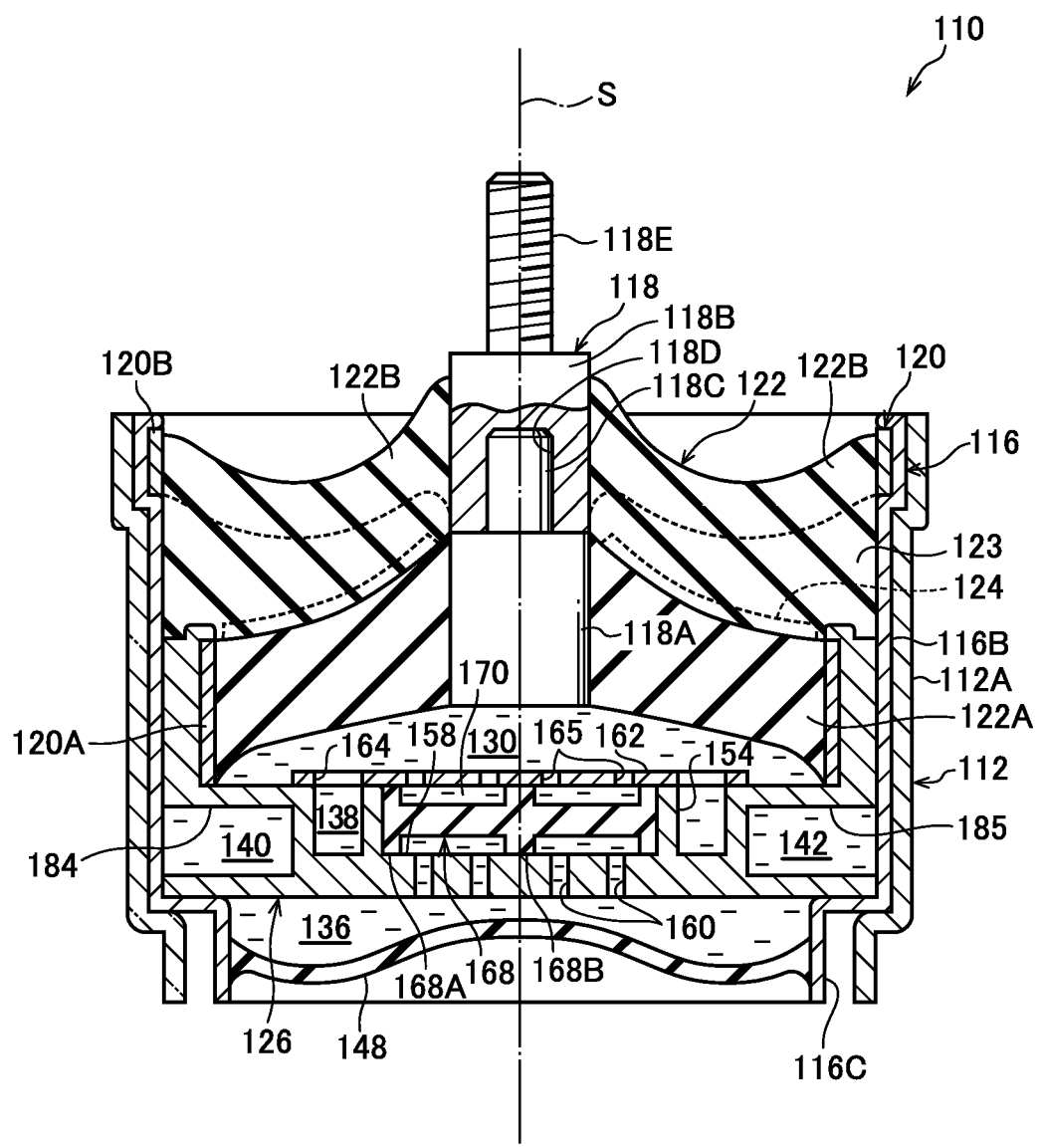
FIG. 19 is a cross-section taken along the axial direction at a different position to FIG. 18 and illustrating a vibration damping device according to the fourth exemplary embodiment of the present invention.

FIG. 18 and FIG. 19 show a vibration damping device according to the present exemplary embodiment. This vibration damping device 110 is applied as an engine mount in a vehicle, supporting an engine that acts as a vibration generation section to a vehicle body serving as a vibration receiving section. Note that in FIG. 18, the single-dot dashed line marked with the letter S indicates the device center axis, and the device axial direction is aligned along the axis S. The vibration damping device of the present invention is installed such that the axial direction S is the main vibration input direction. In the following explanation, a direction orthogonal to the axis S corresponds to the vibration damping device 110 radial direction.

As shown in FIG. 18 and FIG. 19, the vibration damping device 110 is provided with a bracket 112 for coupling and fixing the vibration damping device 110 to the vehicle body side. The bracket 112 is provided with a circular cylinder shaped holder portion 112A and a pair of leg portions 112B that extend in the radial direction from lower end portions of the holder portion 112A. Leading end portions of the pair of leg portions 112B are respectively provided with attachment holes 114 for coupling to the vehicle body.

A substantially circular cylinder shaped outer cylinder fixing 116 that serves as an outer peripheral member and is open at both axial direction ends is disposed inside the holder portion 112A of the bracket 112. The outer cylinder fixing 116 fits together with an inner peripheral face of the holder portion 112A. An upper side of the outer cylinder fixing 116 configures an outer cylinder upper portion 116A with a slightly larger diameter than an outer cylinder intermediate portion 116B, and a lower side of the outer cylinder fixing 116 configures an outer cylinder lower portion 116C having a smaller diameter than the outer cylinder intermediate portion 116B. A substantially circular column shaped inside attachment fixing 118 is disposed coaxially to the outer cylinder fixing 116 to the peripheral inside of the outer cylinder fixing 116.

The inside attachment fixing 118 is divided into a shaft shaped lower fixing 118A positioned at the lower side in FIG. 18 and FIG. 19, and a shaft shaped upper fixing 118B positioned to the upper side of the lower fixing 118A. A projection portion 118C is formed at the upper side of the lower fixing 118A. A bolt shaft 118E projects upwards along the axis S at the upper side of the upper fixing 118B. A fitting hole 118D is formed at the lower side of the upper fixing 118B. The projection portion 118C of the lower fixing 118A is fitted into the fitting hole 118D of the upper fixing 118B, thereby coupling the upper fixing 118B and the lower fixing 118A together. The upper fixing 118B and the lower fixing 118A have substantially the same outer diameter and are coupled together to configure the shaft shaped inside attachment fixing 118.

Note that in order to couple the vibration damping device 110 to the vehicle body side, bolts (not shown in the drawings) are inserted into the respective attachment holes 114 of the pair of leg portions 112B, and leading end portions of the bolts are screwed into the vehicle body side, thereby fastening and fixing the vibration damping device 110 to the vehicle body side through the bracket 112. The inside attachment fixing 118 is also fastened and fixed to the engine side of the vehicle through the bolt shaft 118E.

An upper connector 120B and a lower connector 120A, each formed from metal in a ring shape, are disposed at the inner peripheral face of the outer cylinder fixing 116. The upper connector 120B, positioned on the upper side in FIG. 18 and FIG. 19, is configured with a larger diameter than the lower connector 120A, positioned on the lower side in FIG. 18 and FIG. 19. The outer peripheral face of the upper connector 120B fits together with an upper end portion of the inner peripheral face of the outer cylinder fixing 116, and is coupled to the outer cylinder fixing 116. The lower connector 120A fits together with the inside of the outer cylinder fixing 116 through a partitioning member 126, described later, and is coupled to the outer cylinder fixing 116.

An elastic body main portion 122A formed from rubber with an overall thickened circular plate shape is disposed between the lower connector 120A and the lower fixing 118A of the inside attachment fixing 118. The elastic body main portion 122A is respectively connected to the outer peripheral face of the lower fixing 118A and the inner peripheral face of the lower connector 120A by vulcanization bonding. The lower face of the elastic body main portion 122A is configured in a recessed shape.

An upper elastic body 122B formed from rubber with an overall thickened circular plate shape is disposed between the upper connector 120B and the upper fixing 118B of the inside attachment fixing 118. The upper elastic body 122B is respectively connected to the outer peripheral face of the upper fixing 118B and the inner peripheral face of the lower connector 120A by vulcanization bonding. The inside attachment fixing 118 and the outer cylinder fixing 116 are thereby elastically connected to each other by a rubber elastic body 122 configured by the elastic body main portion 122A and the upper elastic body 122B through the upper connector 120B and the lower connector 120A.

Figure 20:
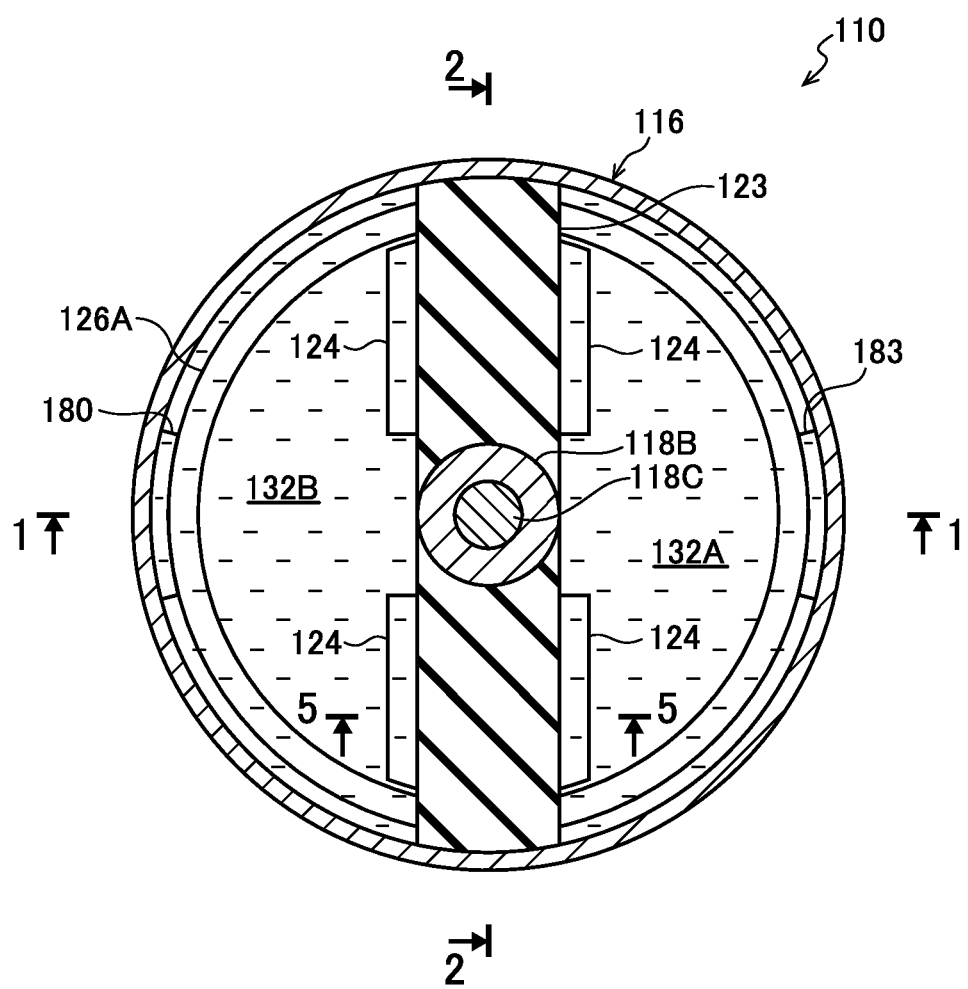
FIG. 20 is a cross-section taken along the axial orthogonal direction illustrating a configuration of a main body portion of a vibration damping device according to the fourth exemplary embodiment of the present invention.
Figure 21:
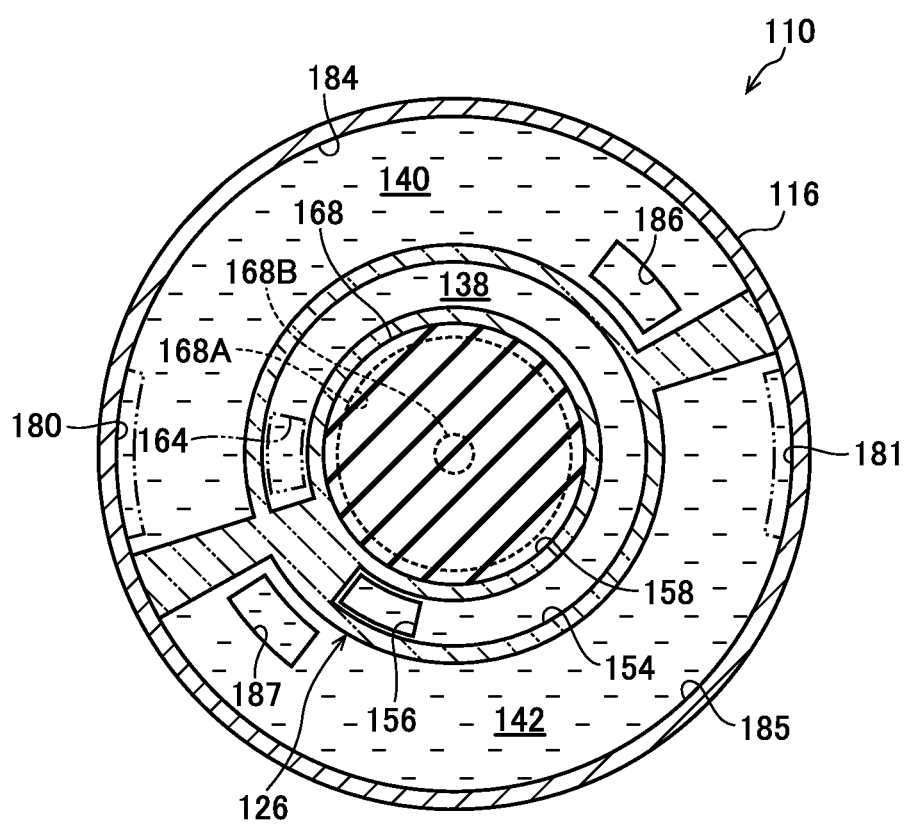
FIG. 21 is a cross-section taken along the axial orthogonal direction at a different position to FIG. 20 and illustrating a main body portion of a vibration damping device according to the fourth exemplary embodiment of the present invention.

As shown in FIG. 18, the elastic body main portion 122A and the upper elastic body 122B are separated from each other along the axial direction S, so as to configure a liquid chamber 132 between the elastic body main portion 122A and the upper elastic body 122B. As shown in FIG. 20, the liquid chamber 132 is partitioned in the circumferential direction into a second main liquid chamber 132A and a second main liquid chamber 132B by partitioning walls 123. The second main liquid chamber 132A and the second main liquid chamber 132B are filled with a liquid such as ethylene glycol or a silicone oil.

Figure 25A:
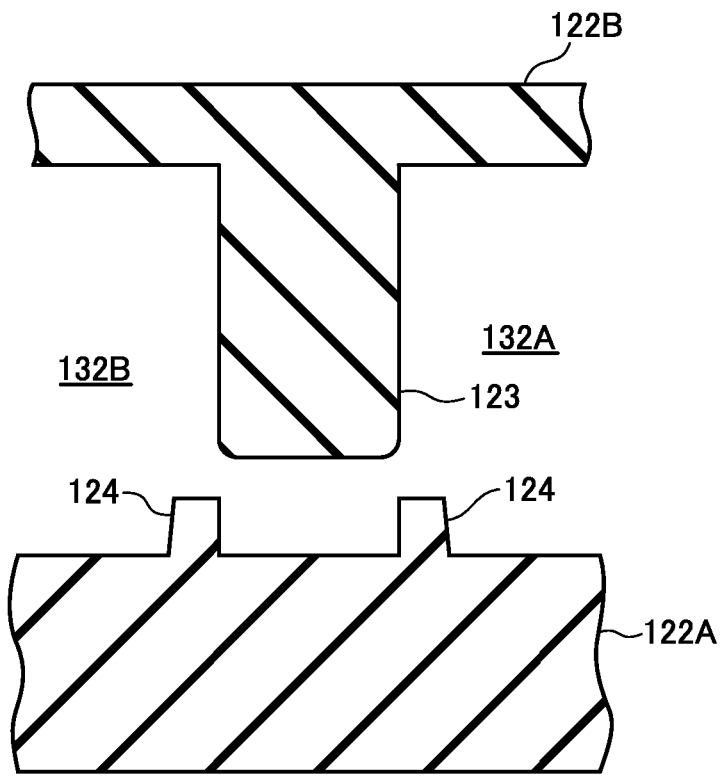
FIG. 25A illustrates a state prior to coupling of a partitioning wall and an elastic body main portion in a vibration damping device according to the fourth exemplary embodiment of the present invention.
Figure 25B:
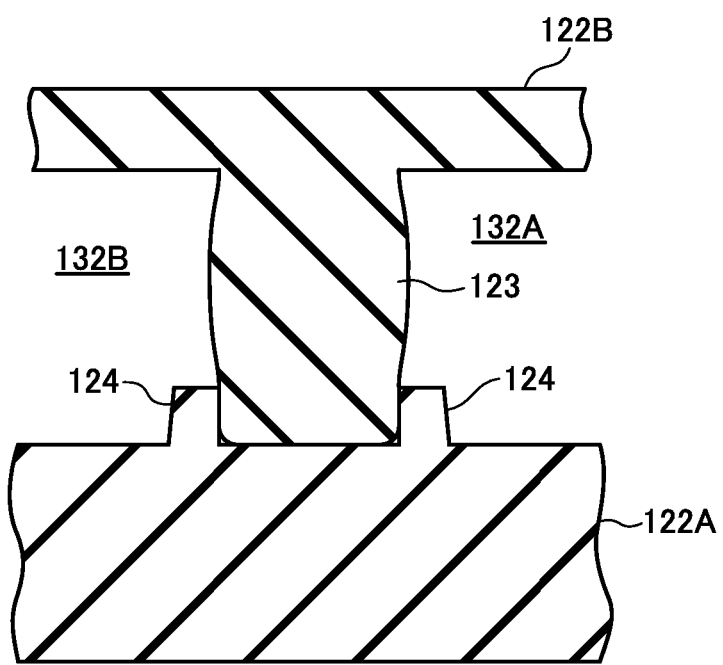
FIG. 25B illustrates a coupled state of a partitioning wall and an elastic body main portion in a vibration damping device according to the fourth exemplary embodiment of the present invention.

The partitioning walls 123 are formed from rubber and are configured integrally to the upper elastic body 122B. As shown in FIG. 19, the partitioning walls 123 are disposed at the lower face of the upper elastic body 122B as a protrusion shape along the radial direction so as to partition the space between the upper elastic body 122B and the elastic body main portion 122A. Elastic body main portion 122A side leading end portions of the partitioning walls 123 are in tight contact with the elastic body main portion 122A, as shown in FIG. 25B, and radial direction outside end portions of the partitioning walls 123 are in press-contact with the inner wall of the outer cylinder fixing 116.

Both width direction outside faces of the partitioning walls 123 are clamped by retaining portions 124. The retaining portions 124 are integrally formed to the elastic body main portion 122A at the upper face of the elastic body main portion 122A. The retaining portions 124 are configured by a pair of two protrusion shapes so as to clamp the partitioning walls 123 at both width direction sides of the partitioning walls 123. Lower sides of the partitioning walls 123 are clamped by the retaining portions 124.

The partitioning walls 123 are in a compressed state in the axial direction S in a retained state of the upper connector 120B and the lower connector 120A in the outer cylinder fixing 116 and the partitioning member 126, respectively. The compression ratio at the radial direction outside is preferably greater than the compression ratio at the radial direction inside.

As shown in FIG. 18 and FIG. 19, the substantially circular plate shaped partitioning member 126 is disposed to the lower side of the elastic body main portion 122A (the opposite side to the upper elastic body 122B). The partitioning member 126 is fitted into the outer cylinder fixing 116 such that an outer peripheral portion of the partitioning member 126 contacts a step portion between the outside intermediate portion 116B and the outside lower portion 116C of the outer cylinder fixing 116. A lower face peripheral edge portion of the elastic body main portion 122A makes press-contact with an outer peripheral portion of the partitioning member 126.

The partitioning member 126 accordingly configures a space partitioned off from the outside between the partitioning member 126 and the elastic body main portion 122A. This space configures a first main liquid chamber 130 filled with a liquid such as ethylene glycol or a silicone oil.

A thin membranous rubber-formed diaphragm 148 is vulcanize-bonded to an inner peripheral face of the outer cylinder lower portion 116C of the outer cylinder fixing 116 so as to close off a lower end portion of the outer cylinder fixing 116. A space partitioned off from the outside by the diaphragm 148 and the partitioning member 126 is accordingly formed at a lower portion inside the outer cylinder fixing 116. This space is filled with a liquid such as ethylene glycol or silicone oil so as to configure an auxiliary liquid chamber 136. The diaphragm 148 that configures part of the walls of the auxiliary liquid chamber 136 is capable of elastic deformation such that the internal volume of the auxiliary liquid chamber 136 expands and contracts in response to pressure changes in the liquid with which the auxiliary liquid chamber 136 is filled.

A groove portion 154 that has a circumferential direction ring shape centered on the axis S is formed to an upper face portion of the partitioning member 126 around nearly the entire periphery. A first end portion of the groove portion 154 is formed with a communication hole 156 that penetrates to the lower face of the partitioning member 126. As shown in FIG. 18, a circular shaped recessed portion 158 is formed to the partitioning member 126 at a peripheral inside portion of the groove portion 154. Plural opening portions 160 are formed to a bottom plate portion of the recessed portion 158, the opening portions 160 penetrating to the lower face of the partitioning member 126.

A circular plate shaped closing plate 162 with a shape that blocks off an upper face portion of the recessed portion 158 is fixed to the partitioning member 126. A location on the closing plate 162 that corresponds to a second end portion of the groove portion 154 is formed with a communication hole 164. A location on the closing plate 162 facing the recessed portion 158 is formed with plural opening portions 165.

The communication hole 156 and the groove portion 154 of the partitioning member 126 and the communication hole 164 of the closing plate 162 configure a first orifice 138 serving as a restriction path that places the first main liquid chamber 130 and the auxiliary liquid chamber 136 in communication with each other. The first main liquid chamber 130 and the auxiliary liquid chamber 136 are in communication with each other through the first orifice 138, such that liquid is able to flow between the first main liquid chamber 130 and the auxiliary liquid chamber 136.

The recessed portion 158 of the partitioning member 126 closed off at the upper face side by the closing plate 162 configures a housing chamber 170 that houses a rubber moveable plate 168 that serves as a membrane. The moveable plate 168 is formed in a substantially circular plate shape, and is configured with an external diameter that is substantially the same as the internal diameter of the housing chamber 170. The moveable plate 168 is fitted into the housing chamber 170. An outer peripheral portion of the moveable plate 168 is formed with a ring shaped outer peripheral guide portion 168A that projects out towards the top and bottom. A central portion of the moveable plate 168 is formed with a central guide portion 168B that projects out towards the top and bottom. The outer peripheral guide portion 168A and the central guide portion 168B are set slightly higher than the axial direction height of the housing chamber 170, and both the guide portions 168A, 168B are configured so as to be precompressed during attachment of the closing plate 162.

A ring portion 126A is formed to the radial direction outside of the partitioning member 126, so as to extend towards the upper side in a ring shape from an outer peripheral portion of the partitioning member 126, and to have an external diameter dimension corresponding to the internal diameter of the outer cylinder fixing 116. The ring portion 126A is inserted into the inner peripheral face of the outer cylinder fixing 116, such that the outer peripheral face of the ring portion 126A makes press-contact with the inner peripheral face of the outer cylinder fixing 116. The internal diameter of the ring portion 126A has an outer diameter corresponding to the lower connector 120A, and the inner peripheral face of the ring portion 126A contacts the outer peripheral face of the lower connector 120A. A lower end portion of the lower connector 120A contacts the upper face portion of the partitioning member 126, and an upper end portion of the lower connector 120A is swaged to an upper end portion of the ring portion 126A that extends towards the top side from the partitioning member 126, thereby fixing the lower connector 120A to the partitioning member 126. The lower connector 120A is thereby connected to the outer cylinder fixing 116 through the partitioning member 126. The axial direction S separation between the upper connector 120B and the lower connector 120A is set such that the partitioning wall 123 is compressed at a specific compression ratio.

An outer peripheral groove 180 and an outer peripheral groove 181 are configured extending in the top-bottom direction at symmetrical positions on the outer peripheral face of the ring portion 126A on either side of the inside attachment fixing 118, respectively. An upper side communication opening 182 is formed to the ring portion 126A so as to penetrate an upper end portion of the ring portion 126A from a first end portion of the outer peripheral groove 180. The other end of the outer peripheral groove 180 is connected to a first end of a groove portion 184 formed in a circumferential shape around substantially half the circumference of a main body portion of the partitioning member 126. A lower side communication opening 186 is formed at the other end of the groove portion 184 so as to penetrate towards the auxiliary liquid chamber 136 on the lower side.

An upper side communication opening 183 is formed to the ring portion 126A so as to penetrate an upper end portion of the ring portion 126A from a first end portion of the outer peripheral groove 181. The other end portion of the outer peripheral groove 181 is connected to a first end of a groove portion 185 formed in a circumferential shape around substantially half the circumference of the main body portion of the partitioning member 126. A lower side communication opening 187 is formed at the other end of the groove portion 185 so as to penetrate towards the auxiliary liquid chamber 136 on the lower side.

The peripheral outside of the outer peripheral grooves 180, 181 of the ring portion 126A are closed off by the inner peripheral face of the outer cylinder fixing 116. The outer peripheral groove 180 and the groove portion 184 with closed off peripheral outsides configure a second orifice 140 that places the auxiliary liquid chamber 136 and the left side second main liquid chamber 132B in communication with each other. The outer peripheral groove 181 and the groove portion 185 similarly configure a second orifice 142 that places the auxiliary liquid chamber 136 and the right side second main liquid chamber 132A in communication with each other. That is to say, the pair of second orifices 140, 142 allow liquid to flow between the pair of second main liquid chambers 132A, 132B and the auxiliary liquid chamber 136. The path length and cross-sectional area of the second orifices 140, 142 are set (tuned) so as to be adapted for vibration of a desired frequency (for example pitching vibration with frequency of 10 Hz to 15 Hz).

Figure 22:
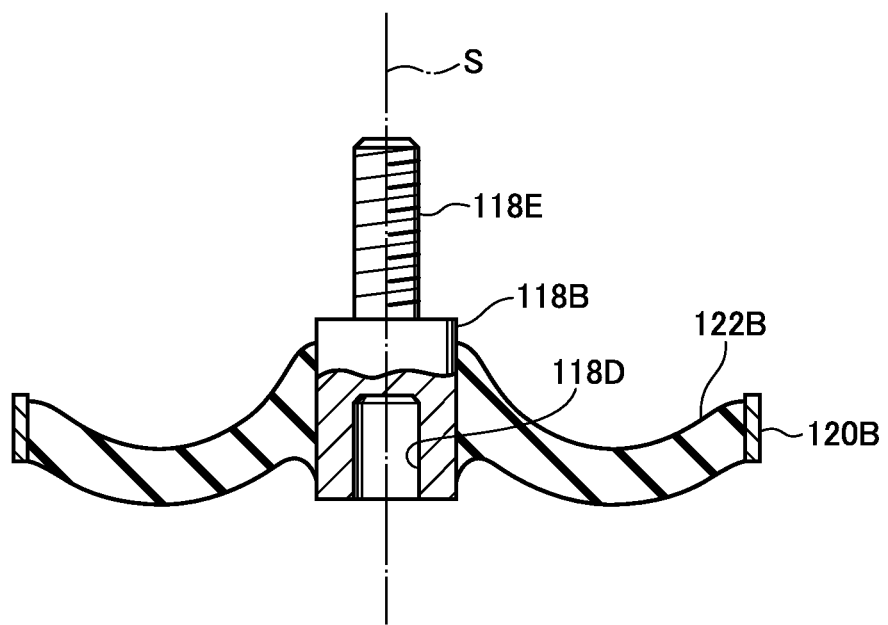
FIG. 22 is a cross-section taken along line 1-1 in FIG. 20, illustrating an upper connector, an upper elastic body and an upper fixing of a vibration damping device according to the fourth exemplary embodiment of the present invention.
Figure 23:
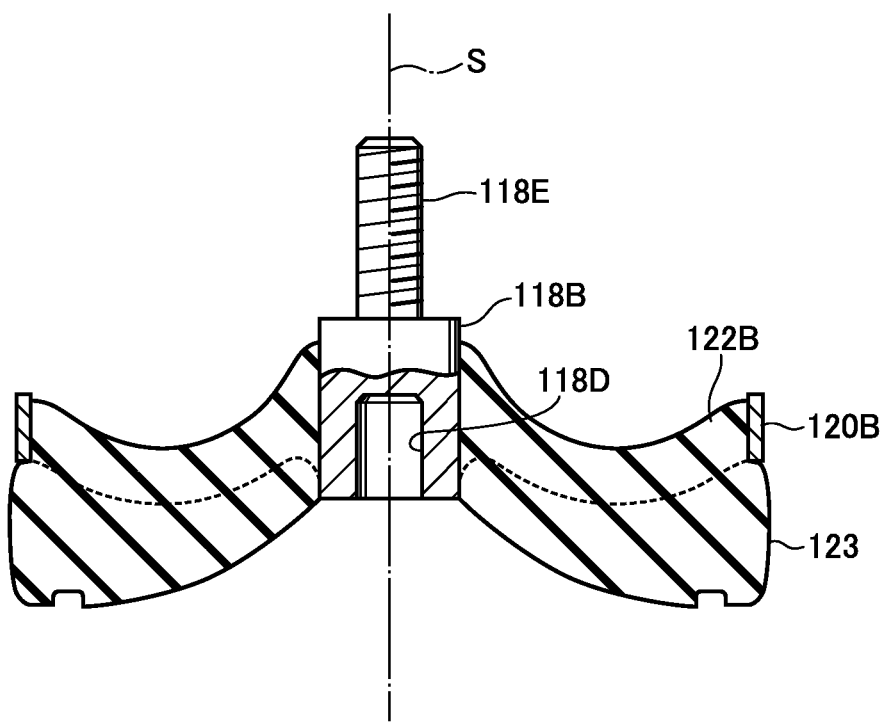
FIG. 23 is a cross-section taken along line 2-2 in FIG. 20, illustrating an upper connector, an upper elastic body, an upper fixing and a partitioning wall of a vibration damping device according to the fourth exemplary embodiment of the present invention.
Figure 24:
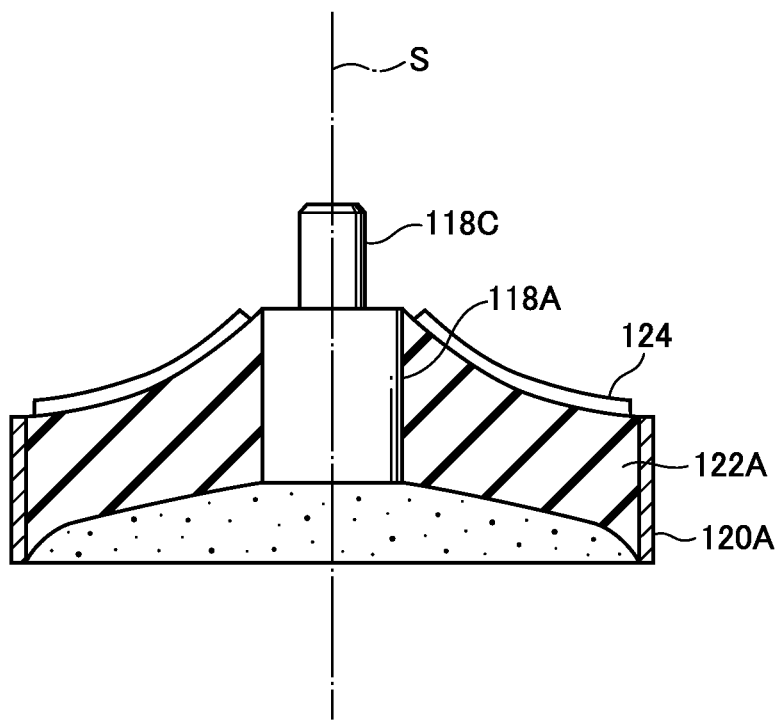
FIG. 24 is a cross-section illustrating a lower connector, an elastic body main portion and a lower fixing of a vibration damping device according to the fourth exemplary embodiment of the present invention.

During assembly of the vibration damping device 110 of the present exemplary embodiment, as shown in FIG. 24, the elastic body main portion 122A is first vulcanize-molded between the lower fixing 118A of the inside attachment fixing 118 and the lower connector 120A. The upper elastic body 122B and the partitioning walls 123 are similarly vulcanize-molded between the upper fixing 118B and the upper connector 120B, as shown in FIG. 22 and FIG. 23.

Next, the projection portion 118C of the lower fixing 118A is fitted into the fitting hole 118D of the upper fixing 118B so as to assemble the inside attachment fixing 118. As shown in FIG. 25A and FIG. 25B, the partitioning walls 123 are disposed at this stage in the recessed portions configured by the two retaining portions 124, and the partitioning walls 123 are clamped by the retaining portions 124.

Next, the lower connector 120A is fitted to the partitioning member 126, and the upper connector 120B and the partitioning member 126 are fitted at a specific position inside the outer cylinder fixing 116. Here, the partitioning member 126 is inserted from the upper side of the outer cylinder fixing 116, and the upper connector 120B is housed inside the outer cylinder fixing 116 such that the partitioning wall 123 undergoes compression deformation, as shown in FIG. 25B, from the state shown in FIG. 25A. In this state, the entire outer cylinder fixing 116 is swaged towards the peripheral inside. The upper connector 120B, the lower connector 120A and the partitioning member 126 are thereby fixed with respect to the outer cylinder fixing 116. Note that the liquid with which the inside is filled is prepared, and this assembly operation takes place submerged in the liquid. The liquid can accordingly fill the first main liquid chamber 130, the second main liquid chamber 132, the auxiliary liquid chamber 136, the first orifice 138 and the second orifices 140, 142. The outer cylinder fixing 116 is then inserted into holder portion 112A of the bracket 112, and once again fixed by swaging from the outside. The vibration damping device 110 can be manufactured as described above.

Explanation follows regarding operation of the vibration damping device 110 according to the present exemplary embodiment configured as described above. In the present exemplary embodiment, when the engine that is coupled to the inside attachment fixing 118 is actuated, vibration from the engine is transmitted through the inside attachment fixing 118 to the elastic body main portion 122A and the upper elastic body 122B that configure the rubber elastic body 122. When this occurs, the elastic body main portion 122A acts overall as a vibration absorption main body, with the elastic body main portion 122A undergoing elastic deformation and absorbing vibration due to an attenuating action based on for example internal friction. Vibration transmitted to the vehicle body side is thereby reduced.

Note that the main vibrations input from the engine to the vibration damping device 110 include for example vibration (main vibration) generated by the back and forth movement of the pistons inside their cylinders in the engine, and vibration (secondary vibration) generated by changes to the rotation speed of the crankshaft in the engine. With a straight engine, the amplitude direction of the main vibration (main amplitude direction) is substantially the same direction as the vehicle top-bottom direction, and the amplitude direction of the secondary vibration (secondary amplitude direction) is substantially the same direction as the vehicle front-rear direction (for a transverse mounted engine) or the vehicle left-right direction (for a longitudinally mounted engine), this being orthogonal to the amplitude direction of the main vibration.

The rubber elastic body 122 absorbs a portion of the vibration due to the attenuating action of internal friction, whether the input vibration is a main vibration along a main amplitude direction substantially along the axial direction S of the vibration damping device 110, or a secondary vibration along a secondary amplitude direction that is substantially orthogonal to the main amplitude direction.

Moreover, when vibration is input from the engine side to the inside attachment fixing 118 along the main amplitude direction, the elastic body main portion 122A undergoes elastic deformation mainly along the main amplitude direction and the internal volume of the first main liquid chamber 130 expands and contracts. Liquid accordingly flows through the first orifice 138 between the first main liquid chamber 130 and the auxiliary liquid chamber 136, configured such that the internal volume is capable of changing in response to changes in liquid pressure.

The path length and cross-sectional area of the first orifice 138 are set here to correspond to vibration frequencies in a specific band (a relatively low frequency band). Hence, when the input main vibration is a vibration of the corresponding band, resonance (liquid column resonance) occurs in the liquid that is flowing through the first orifice 138 between the first main liquid chamber 130 and the auxiliary liquid chamber 136 in synchronization with the input vibration. Vibration input along the main amplitude direction can accordingly be particularly effectively absorbed due to changes in liquid pressure and viscous resistance accompanying such liquid column resonance.

Moreover, when the input main vibration has a higher frequency than the frequency of shake vibration and a smaller amplitude thereto, for example at an input vibration of an idling vibration (for example 20 Hz to 30 Hz) with amplitude of between around 0.1 mm to 0.2 mm, the first orifice 138 that is tuned to correspond to shake vibration enters a blocked state, and liquid can no longer flow readily in the first orifice 138. However, when the moveable plate 168 vibrates in the axial direction inside the housing chamber 170 in synchronization with the input vibration, liquid flows in the gap between the internal wall face of the housing chamber 170 and the moveable plate 168, and between the first main liquid chamber 130 and the auxiliary liquid chamber 136, passing through the opening portions 160, 165. As a result, an increase in the kinetic spring constant accompanying an increase in liquid pressure inside the first main liquid chamber 130 can be suppressed, and a low kinetic spring constant can be maintained for the rubber elastic body 122 even when such high frequency vibration is being input. High frequency vibration can therefore also be effectively absorbed due for example to elastic deformation of the rubber elastic body 122.

However, when vibration is input from the engine side to the inside attachment fixing 118 in the secondary amplitude direction, the internal volumes of the second main liquid chambers 132A, 132B alternately expand and contract accompanying elastic deformation of the upper elastic body 122B in the secondary amplitude direction. As a result, liquid flows between the second main liquid chambers 132A, 132B and the auxiliary liquid chamber 136 in synchronization with the input vibration, since the second main liquid chambers 132A, 132B and the auxiliary liquid chamber 136 are respectively in communication with each other through the pair of second orifices 140, 142. When the input secondary vibration is of a specific frequency, resonance is thereby induced in the liquid flowing between the second main liquid chambers 132A, 132B and the auxiliary liquid chamber 136 through the pair of second orifices 140, 142. Vibration of the specific frequency input along the secondary amplitude direction can accordingly be particularly effectively absorbed due to changes in liquid pressure and viscous resistance accompanying the resonance of the liquid.

In the present exemplary embodiment, the partitioning walls 123 that partition the second main liquid chamber 132 are integrally configured to the upper elastic body 122B, whilst being configured as a separate body to the elastic body main portion 122A. Moreover, the outer peripheral end faces of the partitioning walls 123 are not vulcanize-bonded to the outer cylinder fixing 116, but instead make press-contact with the internal wall of the outer cylinder fixing 116. Accordingly, even when vibration that would cause heavy deformation of the partitioning walls 123 is input to the vibration damping device 110 from the engine side, the partitioning walls 123 deform relatively freely, alleviating concentration of stress at specific locations. The durability of the vibration damping device 110 is accordingly enhanced since fatigue does not readily occur in the partitioning walls 123.

Moreover, in the present exemplary embodiment, the partitioning walls 123 are disposed in an axial direction S compressed state. Distortion of the partitioning walls 123 is thereby suppressed, enabling durability to be further enhanced.

Figure 26A:
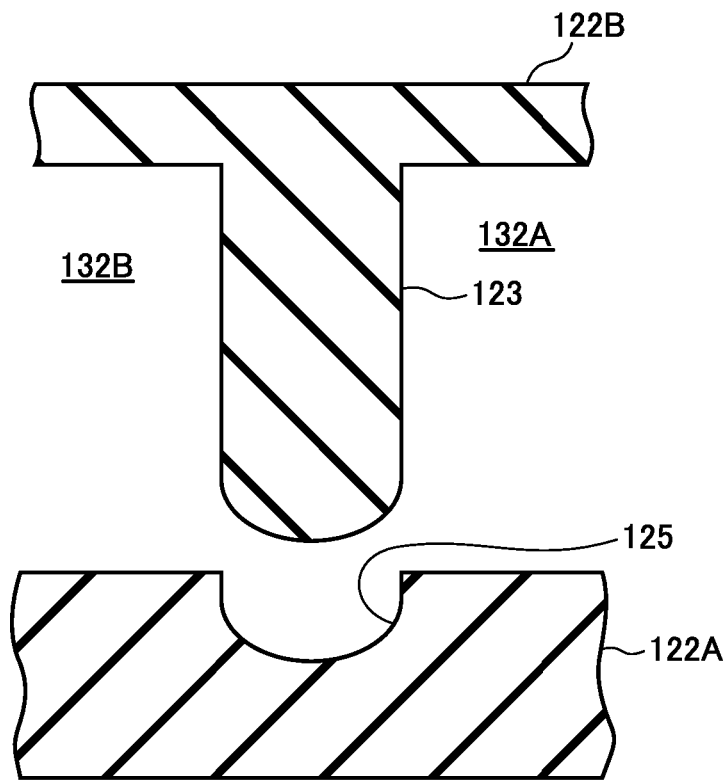
FIG. 26A illustrates a state prior to coupling of a partitioning wall and an elastic body main portion in a modified example of a vibration damping device according to the fourth exemplary embodiment of the present invention.
Figure 26B:
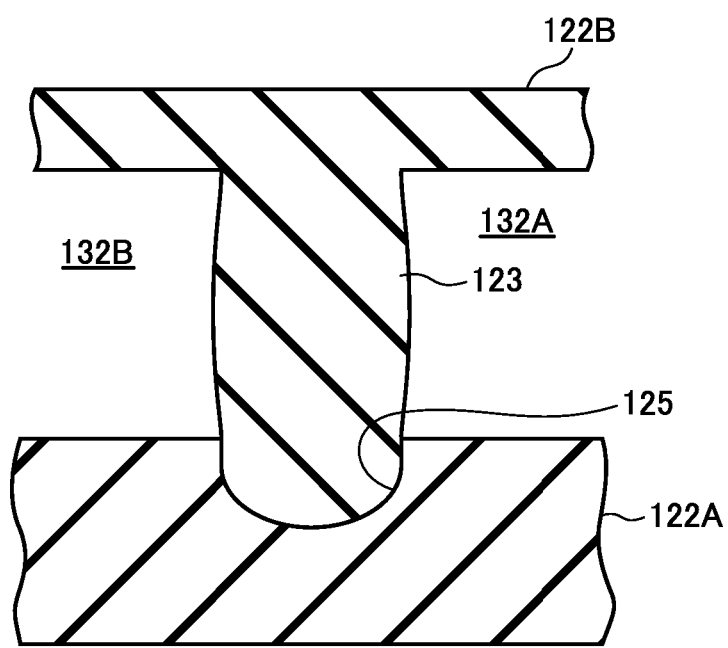
FIG. 26B illustrates a coupled state of a partitioning wall and an elastic body main portion in a modified example of a vibration damping device according to the fourth exemplary embodiment of the present invention.

Note that in the present exemplary embodiment, both outside faces of the partitioning walls 123 are clamped by the retaining portions 124, however configuration may be made employing other methods, such as shown in FIG. 26A and FIG. 26B, whereby leading ends of the partitioning walls 123 are configured in an arc shape and inserted into a groove 125 formed in the elastic body main portion 122A.

Figure 27:
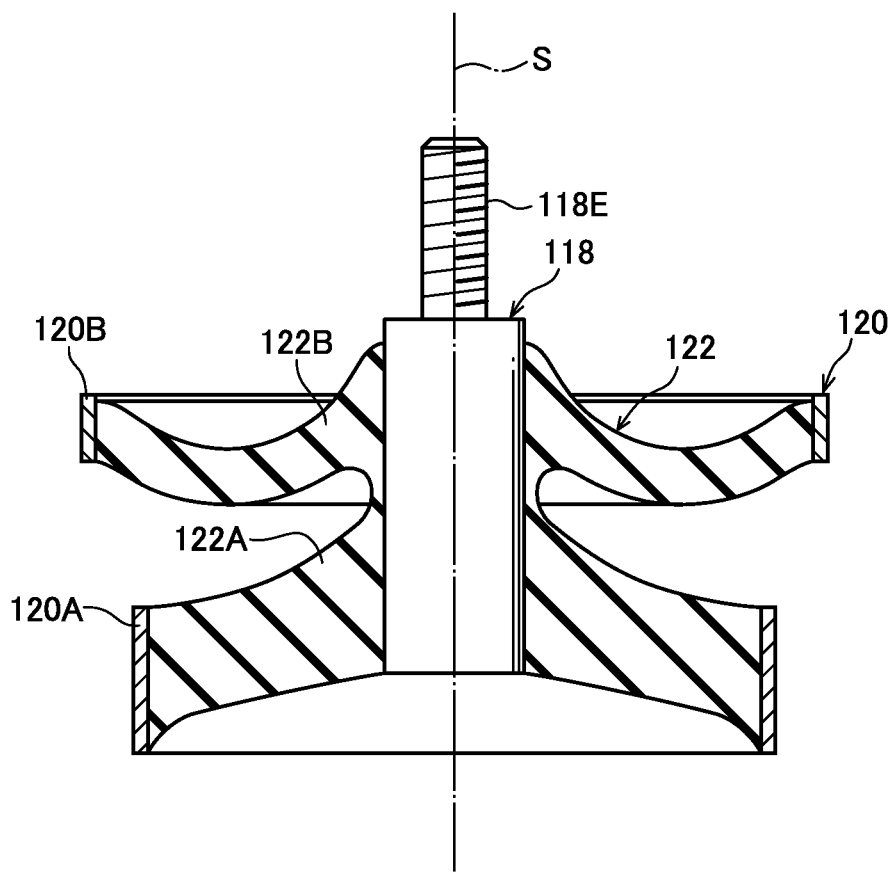
FIG. 27 is a cross-section of a component of a vibration damping device according to a modified example of the fourth exemplary embodiment of the present invention.
Figure 28:
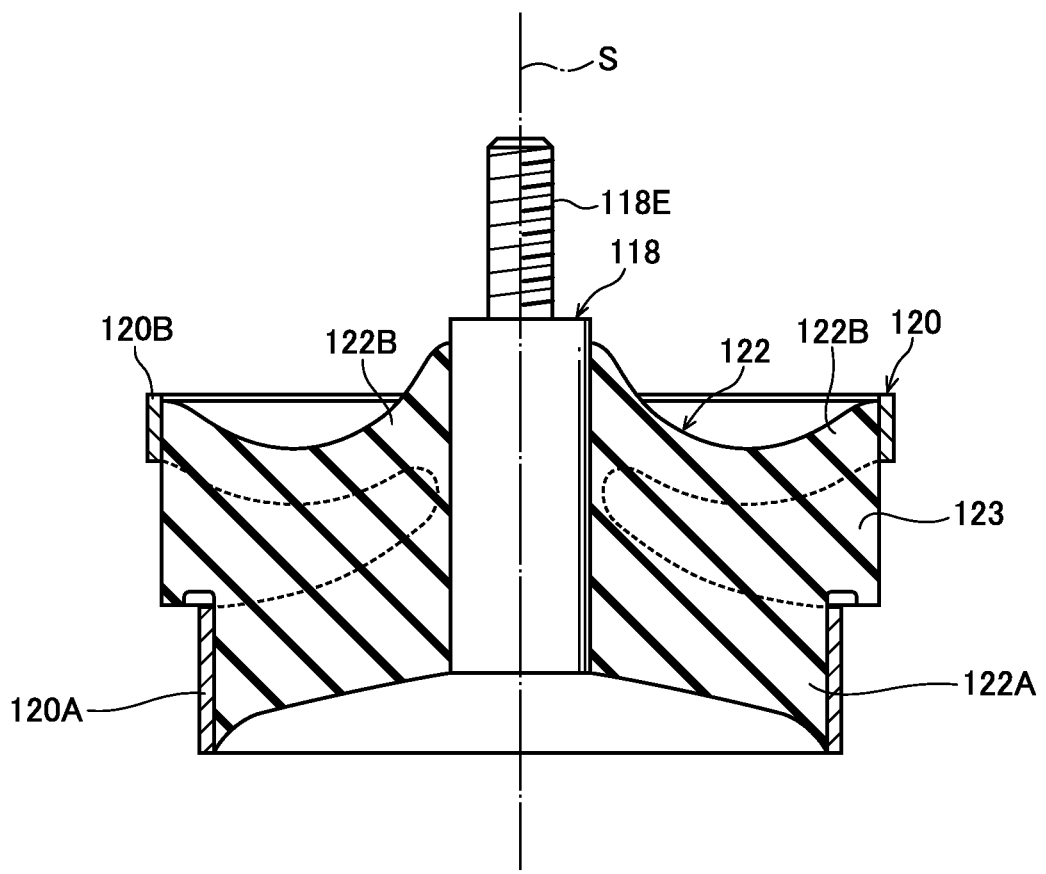
FIG. 28 is a different cross-section to that of FIG. 27 of a component of a vibration damping device according to a modified example of the fourth exemplary embodiment of the present invention.
Figure 29:
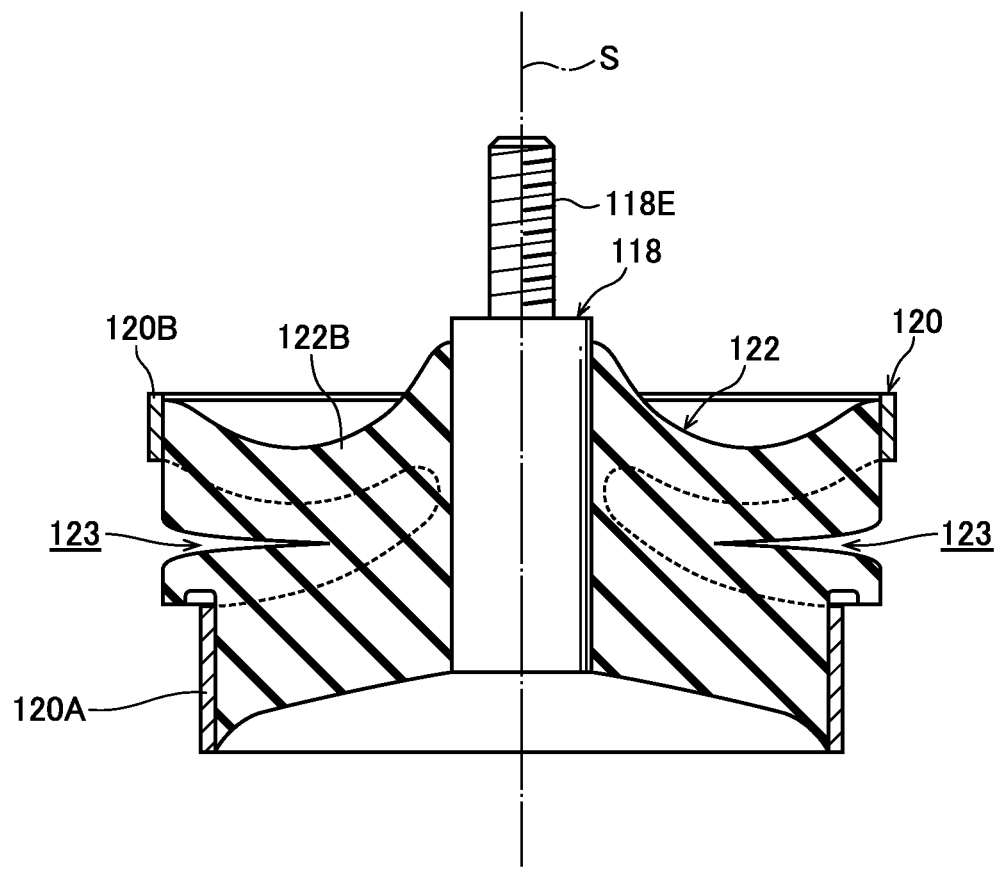
FIG. 29 is a cross-section of a component of a vibration damping device according to a modified example of the fourth exemplary embodiment of the present invention.

In the present exemplary embodiment, the inside attachment fixing 118 is divided into two, however as shown in FIG. 27 and FIG. 28, the inside attachment fixing 118 may be configured by a single member, and the upper elastic body 122B, the elastic body main portion 122A and the partitioning walls 123 may be integrally formed. Integral forming enables a simple configuration to be adopted and easy assembly.

Moreover, as shown in FIG. 19, when the partitioning walls 123 are integrally formed to the upper elastic body 122B and the elastic body main portion 122A, slits 123S may be formed to the partitioning walls 123 from the outer peripheral face towards the inside attachment fixing 118. During assembly of for example the partitioning walls 123 to the outer cylinder fixing 116, the gaps of the slits 123S are tightly closed due to compression of the partitioning walls 123 in the axial direction S. By thus forming the slits 123S, upper side portions and lower side portions of the partitioning walls 123 do not pull each other, and therefore one is not readily negatively influenced by the other. The partitioning walls 23 accordingly deform relatively freely, alleviating concentration of stress, and enabling an increase in the durability of the partitioning walls 123 to be achieved.

In the present exemplary embodiment, the second main liquid chambers 132A, 132B and the auxiliary liquid chamber 136 are placed in communication with each other through the second orifices 140, 142. However, an orifice may be configured to place the second main liquid chamber 132A and the second main liquid chamber 132B in communication with each other. In such cases, configuration may be made with the second orifices 140, 142 provided, or configuration may be made with the second orifices 140, 142 omitted.

Figure 30A:
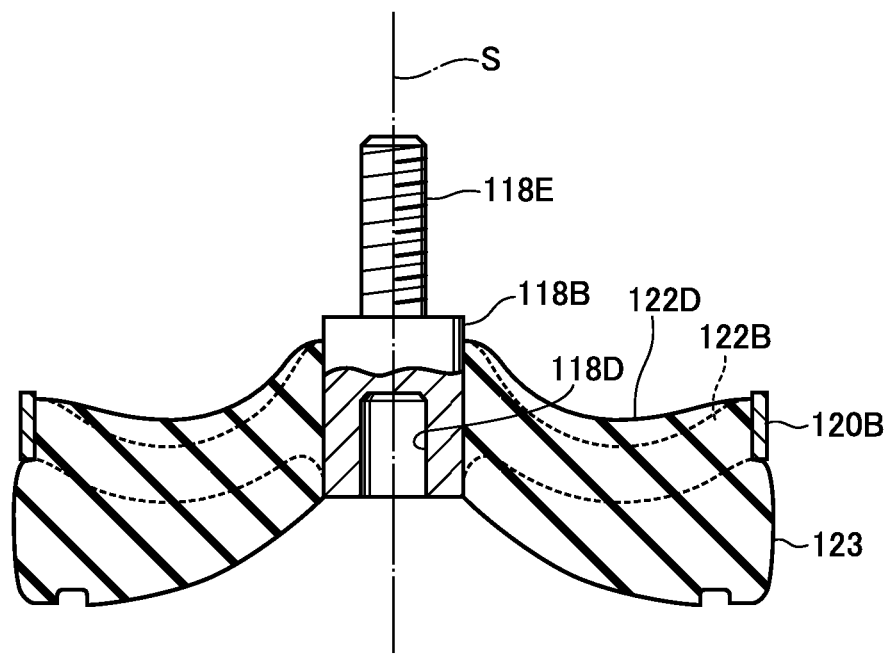
FIG. 30A is a cross-section of a component of a vibration damping device according to a modified example of the fourth exemplary embodiment of the present invention.
Figure 30B:
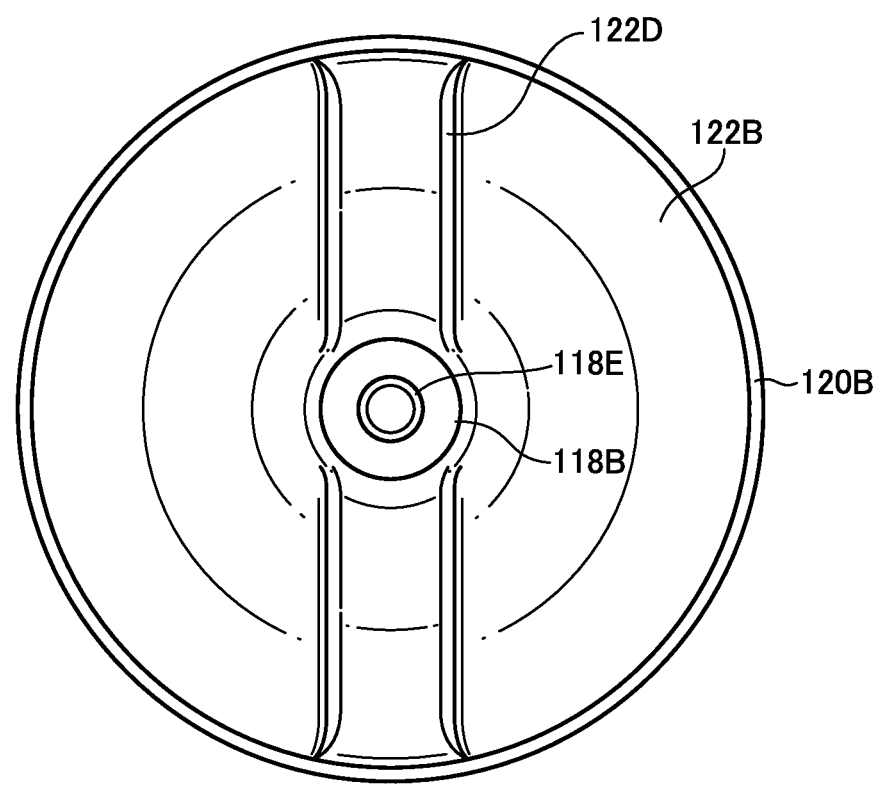
FIG. 30B is a plan view of a component of a vibration damping device according to a modified example of the fourth exemplary embodiment of the present invention.

Moreover, as shown in FIG. 30A and FIG. 30B, a projection portion 122D corresponding to the partitioning walls 123 may be formed to an outside face (upper face) of the upper elastic body 122B of the present exemplary embodiment. Forming the projection portion 122D thus enables the strength of the partitioning walls 123 to be increased, and movement during vibration input to be suppressed.

The invention claimed is:

1. A vibration damping device comprising:
    an inside attachment member that is coupled to one section out of a vibration generation section or a vibration receiving section;
    an outer peripheral member that is coupled to the other section out of the vibration generation section or the vibration receiving section, that is disposed so as to surround the outer periphery of the inside attachment member as viewed along a main vibration input direction, and that comprises an upper segment and a lower segment that are segmented in the main vibration input direction;
    an elastic body that is disposed between the inside attachment member and the outer peripheral member, and that elastically connects together the inside attachment member and the outer peripheral member;
    a first main liquid chamber that is configured at the inside of the outer peripheral member and at the lower segment side and main vibration input direction outside of the inside attachment member, that comprises an internal wall having at least a portion configured by the elastic body, and that is filled with liquid;
    an auxiliary liquid chamber that is filled with liquid and comprises a dividing wall having a portion formed by a diaphragm such that the auxiliary liquid chamber internal volume is capable of expanding and contracting in response to liquid pressure changes;
    a first restriction path that places the first main liquid chamber and the auxiliary liquid chamber in communication with each other and that enables liquid through flow;
    a liquid chamber that is disposed between the inside attachment member and the outer peripheral member as viewed along the main vibration input direction, that has the elastic body partitioning between the liquid chamber and the first main liquid chamber, and that is filled with liquid;
    a partitioning wall that is integrally formed to the elastic body, and that partitions the liquid chamber into a plurality of second main liquid chambers disposed around the outer circumferential direction of the inside attachment member;
    a positioning member that is disposed between the upper segment and the lower segment of the outer peripheral member, and that performs positioning between the upper segment and the lower segment in the main vibration input direction such that the partitioning wall is in a compressed state in the main vibration input direction;
    a retaining member configured in a cylinder shape that retains the upper segment and the lower segment positioned by the positioning member inside the retaining member; and
    a second restriction path that enables liquid to flow between the plurality of second main liquid chambers, or between each of the second main liquid chambers and the auxiliary liquid chamber,
    wherein
        a slit is formed at the partitioning wall at a position between the upper segment and the lower segment and from an outer peripheral member side outer face of the partitioning wall towards the inside attachment member as viewed along the main vibration direction; and
        positioning between the upper outer peripheral member and the lower outer peripheral member is performed by the positioning member such that the interfaces of the slit in the partitioning wall are pressed against each other.

2. The vibration damping device of claim 1, wherein the positioning member is divided into a plurality of divisions around the circumferential direction of the retaining member.

3. The vibration damping device of claim 1, wherein both main vibration input direction end faces of the positioning member respectively contact the upper segment and the lower segment, preventing the upper segment and the lower segment from moving in a direction approaching each other.

4. The vibration damping device of claim 1, wherein at least one of the upper segment or the lower segment is disposed to the peripheral inside of the positioning member.

5. The vibration damping device of claim 1, wherein the second restriction path is configured between the positioning member and the retaining member.

6. The vibration damping device of claim 1, wherein at least one of the upper segment or the lower segment comprises an extension portion that extends towards the other of the upper segment or the lower segment, and the positioning member performs positioning between the upper segment and the lower segment by the extension portion contacting the other of the upper segment or the lower segment.

7. The vibration damping device of claim 6, wherein the second restriction path is configured between the retaining member and the lower segment.

8. The vibration damping device of claim 1, wherein:
the vibration damping device further comprises a partitioning member that is disposed between the first main liquid chamber and the auxiliary liquid chamber and that partitions the chambers from each other; and
the first restricting path is configured in the partitioning member.

9. A vibration damping device comprising:
an inside attachment member that is coupled to one section out of a vibration generation section or a vibration receiving section;
an outer peripheral member that is coupled to the other section out of the vibration generation section or the vibration receiving section, and that is disposed so as to surround the outer periphery of the inside attachment member as viewed along a main vibration input direction;
an elastic body that is disposed between the inside attachment member and the outer peripheral member, that elastically connects together the inside attachment member and the outer peripheral member and configures a liquid chamber between the inside attachment member and the outer peripheral member, and that comprises an upper elastic body positioned at a main vibration input direction first side and an elastic body main portion positioned at the main vibration input direction other side with the liquid chamber interposed between the upper elastic body and the elastic body main portion;
a partitioning wall that is disposed so as to connect together the upper elastic body and the elastic body main portion in a main vibration input direction compressed state, and that partitions the liquid chamber into a plurality of second main liquid chambers disposed around the outer circumferential direction of the inside attachment member;
a first main liquid chamber that is configured at the inside of the outer peripheral member and the main vibration input direction outside of the inside attachment member, that comprises an internal wall having at least a portion configured by the elastic body main portion, and that is filled with liquid;
an auxiliary liquid chamber that is filled with liquid and comprises a dividing wall having a portion formed by a diaphragm such that the auxiliary liquid chamber internal volume is capable of expanding and contracting in response to liquid pressure changes;
a first restriction path that places the first main liquid chamber and the auxiliary liquid chamber in communication with each other and that enables liquid through flow; and
a second restriction path that enables liquid to flow between the plurality of second main liquid chambers, or between each of the second main liquid chambers and the auxiliary liquid chamber,
wherein a projection portion is formed at an outside face of the upper elastic body corresponding to the partitioning wall.

10. The vibration damping device of claim 9, wherein the upper elastic body is connected to the outer peripheral member by an upper connector fixed to the outer periphery of the upper elastic body, and the elastic body main portion is connected to the outer peripheral member by a lower connector fixed to the outer periphery of the elastic body main portion.

11. The vibration damping device of claim 9, wherein the main vibration input direction compression ratio at a radial direction outside of the partitioning wall is greater than the main vibration input direction compression ratio at the radial direction inside of the partitioning wall.

12. The vibration damping device of claim 9, wherein the inside attachment member is divided in the main vibration input direction, with the upper elastic body connected to a first segment of the inside attachment member and with the elastic body main portion, which is configured as a separate body from the upper elastic body, connected to a second segment of the inside attachment member.

13. The vibration damping device of claim 9, wherein the partitioning wall is configured with a slit that extends from an outer peripheral face of the partitioning wall in a radial inward direction.

* * * * *